US012643115B2

(12) United States Patent
Petkus et al.

(10) Patent No.: US 12,643,115 B2
(45) Date of Patent: Jun. 2, 2026

(54) AUTOMOTIVE SPRAY GUN BOTTLE AND ADAPTER

(71) Applicant: W.M. Barr & Company, Inc., Memphis, TN (US)

(72) Inventors: Matthew Michael Petkus, Memphis, TN (US); Rachel Farmer, Memphis, TN (US)

(73) Assignee: W.M. BARR & COMPANY, INC., Memphis, TN (US)

( * ) Notice: Subject to any disclaimer, the term of this patent is extended or adjusted under 35 U.S.C. 154(b) by 459 days.

(21) Appl. No.: 17/154,723

(22) Filed: Jan. 21, 2021

(65) Prior Publication Data

US 2021/0220850 A1 Jul. 22, 2021

Related U.S. Application Data

(60) Provisional application No. 62/964,312, filed on Jan. 22, 2020.

(51) Int. Cl.

*B05B 7/24* (2006.01)
*B65D 47/32* (2006.01)
*B65D 50/00* (2006.01)

(52) U.S. Cl.

CPC ............ *B05B 7/2408* (2013.01); *B65D 47/32* (2013.01); *B65D 50/00* (2013.01); *B65D 2215/00* (2013.01)

(58) Field of Classification Search

CPC ........ B05B 7/2408; B65D 47/32; B65D 50/00
USPC .......................................................... 239/302
See application file for complete search history.

(56) References Cited

U.S. PATENT DOCUMENTS 1,855,373 A 4/1932 Willumsen
2,742,168 A * 4/1956 Panetti ...................... A61J 9/00 215/11.4
4,266,813 A 5/1981 Oliver
5,284,028 A * 2/1994 Stuhmer ............... F25D 31/007 62/530
6,220,311 B1 * 4/2001 Litto .................... B67D 1/0462 141/98
6,536,687 B1 3/2003 Navis et al.
6,802,492 B2 10/2004 Payne
7,625,016 B2 * 12/2009 Kosmyna ............. B05B 7/2408 285/190
9,079,201 B2 7/2015 Shkolnikov et al.
10,589,309 B2 3/2020 Bierie et al.
2004/0251269 A1 12/2004 Gosis et al.
(Continued)

FOREIGN PATENT DOCUMENTS

CA 1152960 A 8/1983
DE 202004003376 U1 7/2005
(Continued)

OTHER PUBLICATIONS

International Search Report and Written Opinion, PCT/US21/14560, dated Apr. 12, 2021, 10 pages.
(Continued)

*Primary Examiner* — Chee-Chong Lee
(74) *Attorney, Agent, or Firm* — Jason A. Smith; Shumaker, Loop & Kendrick, LLP

(57) ABSTRACT

A spray gun bottle having a mouth which opens into a body of the spray gun bottle for containing a liquid, wherein the body of the spray gun bottle has at least one vent. An adapter and spray gun system are also provided.

6 Claims, 39 Drawing Sheets

1020

(56) References Cited

U.S. PATENT DOCUMENTS

| | | | |
|---|---|---|---|
| 2007/0095943 | A1 | 5/2007 | Turnbull et al. |
| 2010/0108783 | A1 | 5/2010 | Joseph et al. |
| 2011/0042340 | A1 | 2/2011 | de Carvalho |
| 2011/0181040 | A1 | 7/2011 | Thompson et al. |
| 2016/0243547 | A1 | 8/2016 | Bar-Ziv et al. |
| 2020/0003348 | A1 | 1/2020 | Sinsel |

FOREIGN PATENT DOCUMENTS

| | | | |
|---|---|---|---|
| WO | 2011090857 | A1 | 7/2011 |
| WO | 2018/137880 | A1 | 8/2018 |
| WO | 2019/012502 | A2 | 1/2019 |
| WO | 20200089502 | A1 | 5/2020 |

OTHER PUBLICATIONS

Approval of Preliminary Examination of National Phase Application issued for Chinese Pat. App. No. 202280045159.8 mailed Mar. 12, 2024 (2 pages).

International Preliminary Report on Patentability Issued on Jan. 4, 2024 in PCT/US2022/033763 (7 Pages).

International Search Report Issued on Sep. 23, 2022 in PCT/US2022/033763 (2 Pages).

International Written Opinion Issued on Sep. 23, 2022 In PCT/US2022/033763 (5 Pages).

Final Office Action Issued on Dec. 18, 2024 in Corresponding U.S. Appl. No. 17/359,020 (13 Pages).

Final Rejection issued for U.S. Appl. No. 17/359,020, mailed Jun. 20, 2024 (19 pages).

Supplementary Search Report for European App No. 21744768.9 (9 Pages).

Non-Final Office Action for U.S. Appl. No. 17/359,020 (16 Pages).

Non-Final Office Action (NFOA) issued in U.S. Appl. No. 17/359,020; issued on Feb. 3, 2025; 20 pages.

Final Office Action issued for U.S. Appl. No. 17/359,020 on Jun. 25, 2025.

* cited by examiner

500

800

AUTOMOTIVE SPRAY GUN BOTTLE AND ADAPTER

CROSS-REFERENCE TO RELATED APPLICATIONS

This application claims priority from U.S. provisional patent application No. 62/964,312, filed on Jan. 22, 2020, in the United States Patent and Trademark Office. The disclosure of which is incorporated herein by reference in its entirety.

FIELD OF THE INVENTION

The present invention relates to a spray gun, more particularly to a bottle and an adapter system for use with a spray gun.

BACKGROUND OF THE INVENTION

A mixing cup is used in the automotive industry in conjunction with a spray gun for painting an automobile. An adapting assembly is used to connect the mixing cup to the spray gun in order to feed liquid from the mixing cup to an inlet port of a spray gun, typically a gravity feed spray gun. The mixing cup is comprised of multiple components, and the process of assembling the mixing cup itself is tedious as it requires multiple steps to be completed prior to paining an automobile.

Thus, there is a need for an alternative to the mixing cup that can be used with a spray gun, for example, in the automotive industry.

SUMMARY OF THE INVENTION

The present invention relates to a bottle having a venting feature for use with a spray gun and an adapter for attachment to the bottle and to a spray gun or other spray device, such as a conventional or High Volume Low Pressure (HVLP) spray gun. The term "spray gun" as used herein, generally refers to a spray gun or other spray device and/or to a universal fitting connected to the spray gun or other spray device.

An adapter is provided for use with the spray gun bottle. The adapter comprises a side configured for attachment to a spray gun.

In an embodiment of the invention, the adapter is a single-sided adapter. The term "single-sided", as used herein, generally refers to the adapter having one side configured for attachment to a spray gun. In a single-sided adapter, the side that is not attached to the spray gun is used for attachment to the spray gun bottle.

In an embodiment of the invention, the adapter is a dual-sided adapter. The term "dual-sided", as used herein, generally refers to the adapter having more than one side configured for attachment to a spray gun. In a dual-sided adapter, the side that is not attached to the spray gun is used for attachment to the spray gun bottle.

The term "friction fit", as used herein, generally refers to a form of fastening between two tight fitting mating parts that produces a joint which is held together by friction after the parts are pushed together.

A spray gun bottle is provided comprising a mouth which opens into a body of the spray gun bottle for containing a liquid, wherein the body of the spray gun bottle comprises at least one vent.

A spray gun system is provided comprising a bottle having a mouth which opens into a body of the bottle for containing a liquid, wherein the mouth has a threaded opening and the body of the bottle comprises at least one vent, and an adapter configured for attachment to the threaded opening of the mouth of the bottle and configured for attachment to a spray gun.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1A:
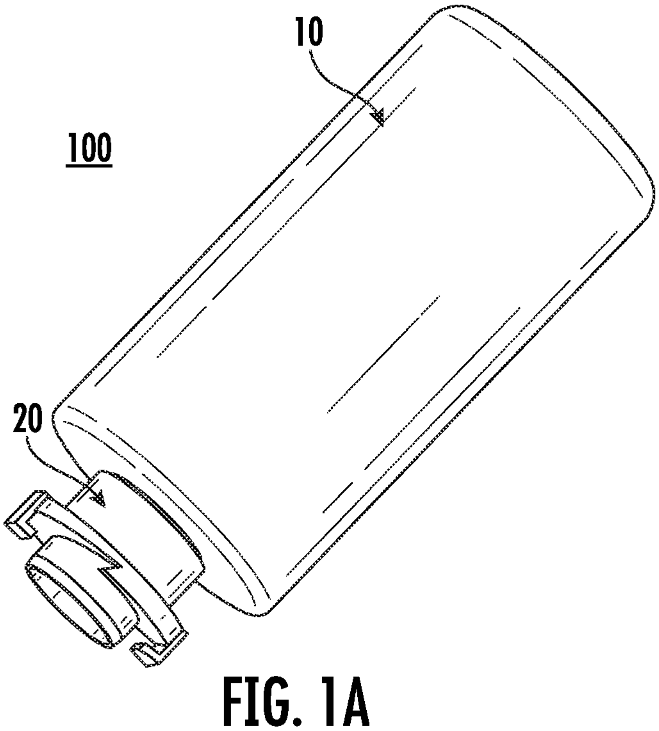
FIGS. 1A and 1B are perspective views of a spray gun bottle assembly comprising a ventable spray gun bottle and a single-sided adapter in accordance with an embodiment of the present invention.
Figure 1B:
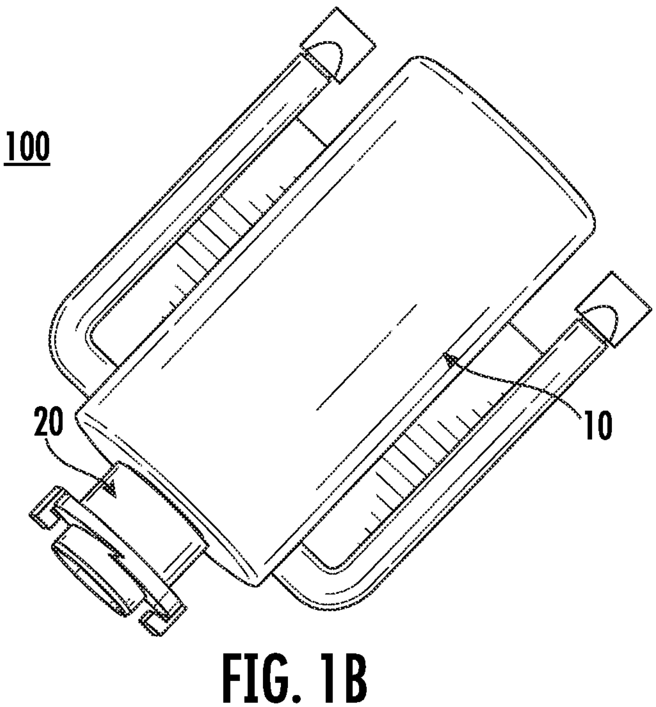

FIGS. 1A and 1B are perspective views of a spray gun bottle assembly 100 comprising a spray gun bottle 10 attached to or connected to a single-sided spray gun adapter 20 for use with a spray gun assembly. Spray gun bottle 10 is preferably a blow molded or extrusion blow molded plastic. Examples of plastics include, but are not limited to, polyethylene terephthalate (PET), nylon, low density polyethylene (LDPE), high density polyethylene (HDPE), polyvinylchloride (PVC), and extrudable PET (EPET) is an extrusion-grade version of the base resin PET having significantly higher intrinsic viscosity and melt strength than traditional PET. The plastic may be treated with fluorination to increase compatibility with volatile organic compounds.

The spray gun bottle contains a liquid or fluid. The liquid may be pre-dosed or pre-filled in the bottle. Examples of liquids are chemical formulations including, but not limited to, pre-coatings, adhesion promoters, coatings, solvents, paint, spray gun cleaners, other chemicals or chemical compositions, or a combination thereof. It can also contemplated and within the scope of the present invention that the bottle could contain a concentrate solution and attach to a gravity fed or venturi hose end device.

Figure 2A:
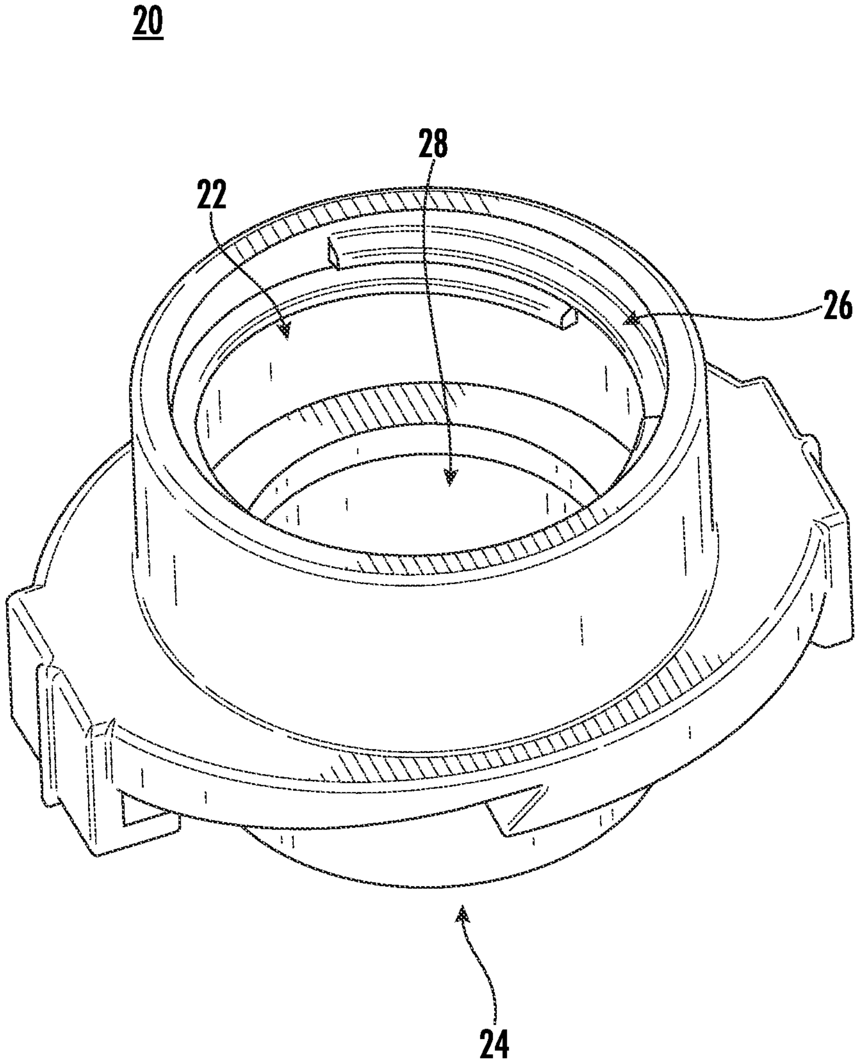
FIG. 2A is a perspective view of the single-sided spray gun adapter of FIGS. 1A and 1B.

FIG. 2A is a perspective view of single-sided spray gun adapter 20 of FIGS. 1A and 1B. Single-sided spray gun adapter 20 has a central bore 28, a bottle attachment end 22 having internal threads 26 for threaded engagement with bottle 10, and a spray gun assembly attachment side 24 for attachment to a spray gun assembly.

Figure 2B:
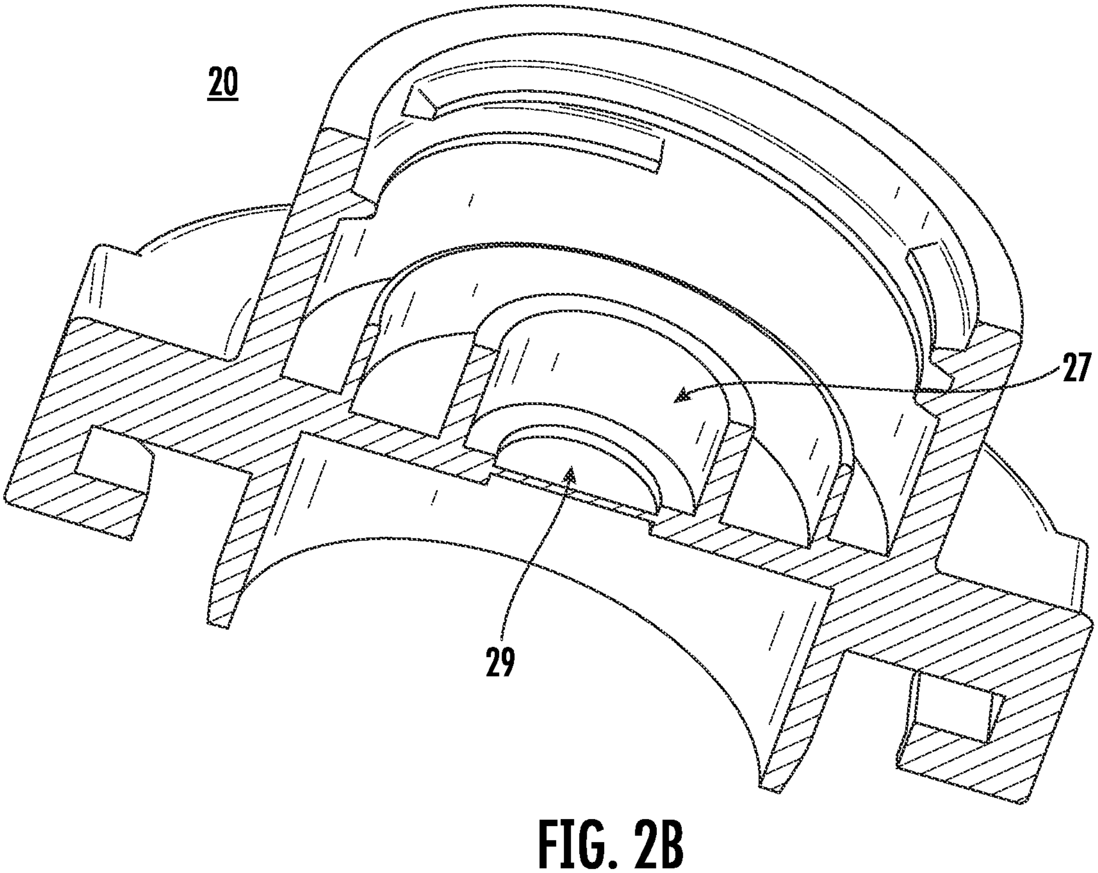
FIG. 2B is a cross-sectional view of the single-sided spray gun adapter of FIG. 2A.

FIG. 2B is a cross-sectional view of the single-sided spray gun adapter 20 of FIG. 2A. FIG. 2B illustrates a pocket 27 for holding a filter that may be inserted in the pocket and an optional puncturable seal membrane 29. The adapter is dual-purpose serving two primary functions of acting as an interface with a spray gun and serving as a cap for the bottle prior to puncture of the seal membrane thereby keeping the bottle sealed during transportation and prior to use.

Figure 3:
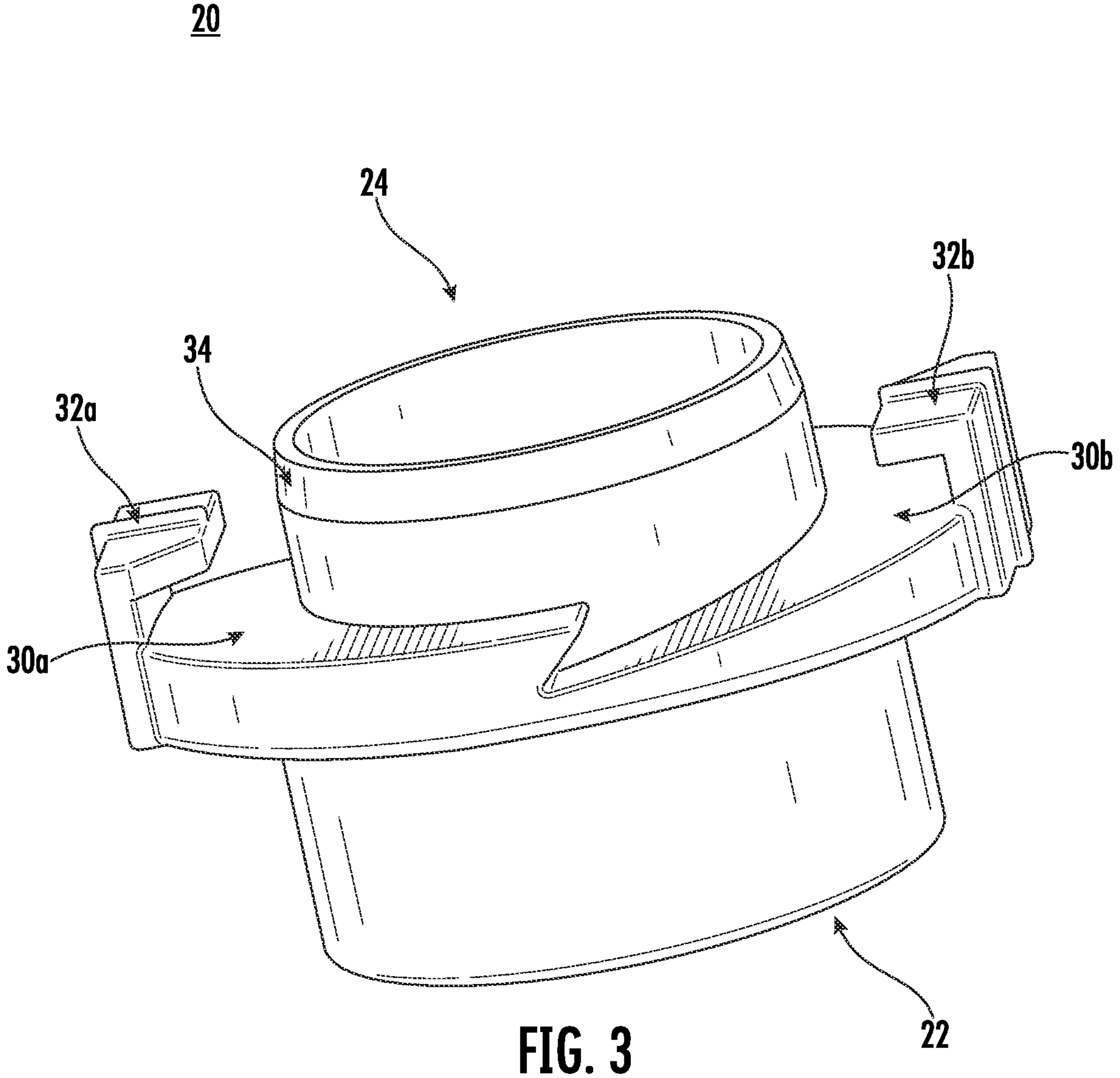
FIG. 3 is a side view of the single-sided spray gun adapter of FIG. 2A.

FIG. 3 is a side view of single-sided spray gun adapter 20 of FIG. 2A. As shown in FIGS. 2 and 3, spray gun attachment side 24 has two helical ramps 30*a*, 30*b* and two “C” shaped clamping features 32*a*, 32*b* to securely fasten the adapter to the spray gun assembly. Once connected, the cylindrical feature 34 provides a fluid tight seal between adapter 20 and a mating fitting of the spray gun assembly.

Figure 4:
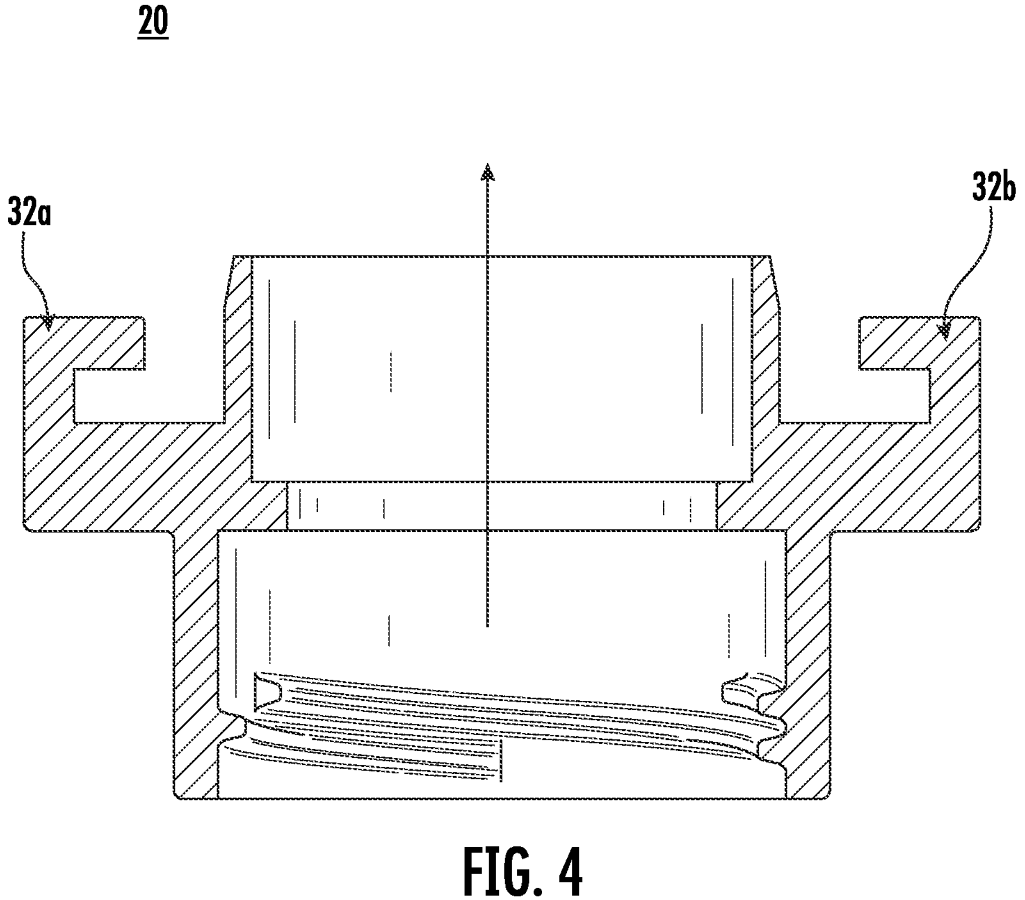
FIG. 4 is a cross-sectional view of the single-sided spray gun adapter of FIG. 2A.

FIG. 4 is a cross-sectional view of single-sided spray gun adapter 20 of FIG. 2A. FIG. 4 shows the fluid path provided going into the spray gun between the two sides of the adapter.

Figure 5:
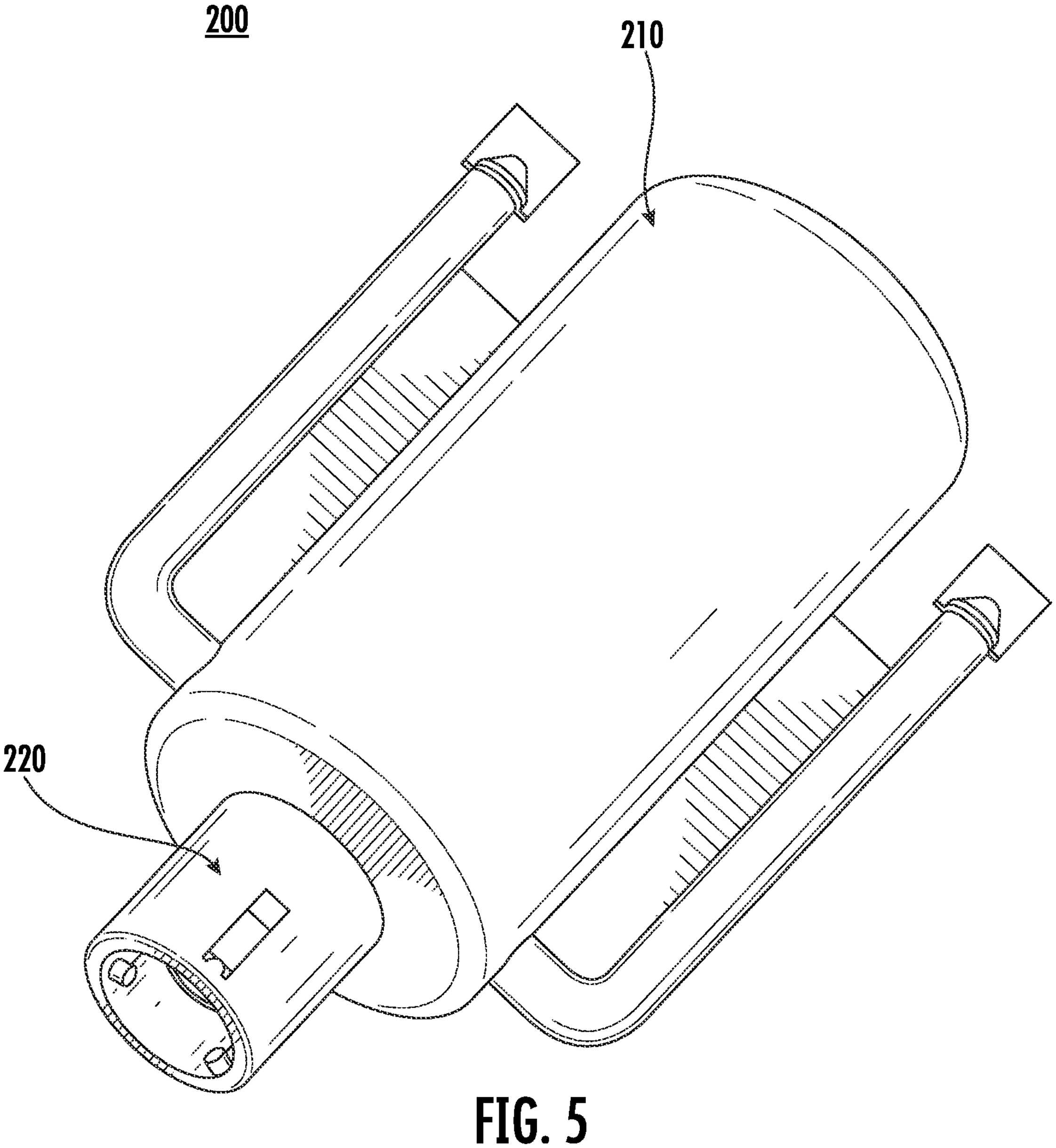
FIG. 5 is a perspective view of a ventable spray gun bottle with a different single-sided spray gun adapter in accordance with an embodiment of the present invention.

FIG. 5 is a perspective view of spray gun bottle assembly 200 comprising bottle 210 and single-sided adapter 220 in accordance with an embodiment of the present invention. Spray gun bottle assembly 200 allows the liquid to be connected to an already outfitted cup connection of a spray gun.

Figure 6A:
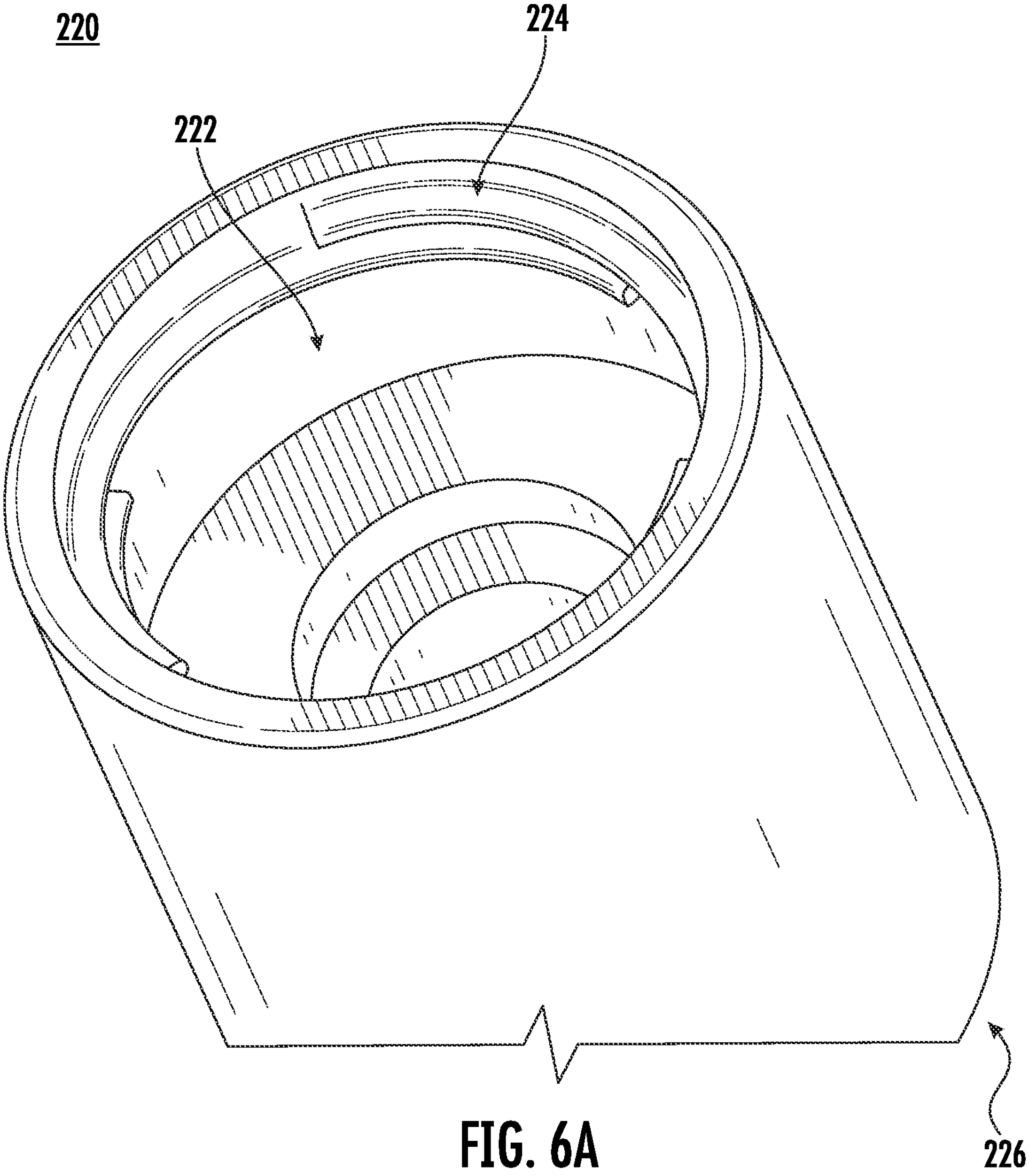
FIG. 6A is a perspective view of the bottle connection side of the single-sided adapter of FIG. 5.

FIG. 6A is a perspective view of a bottle connection side 222 of the single-sided adapter 220 of FIG. 5. Bottle connection side 222 has internal threads 224 for threaded engagement with bottle 210. An opposing spray gun assembly connection side 226 is also shown.

Figure 6B:
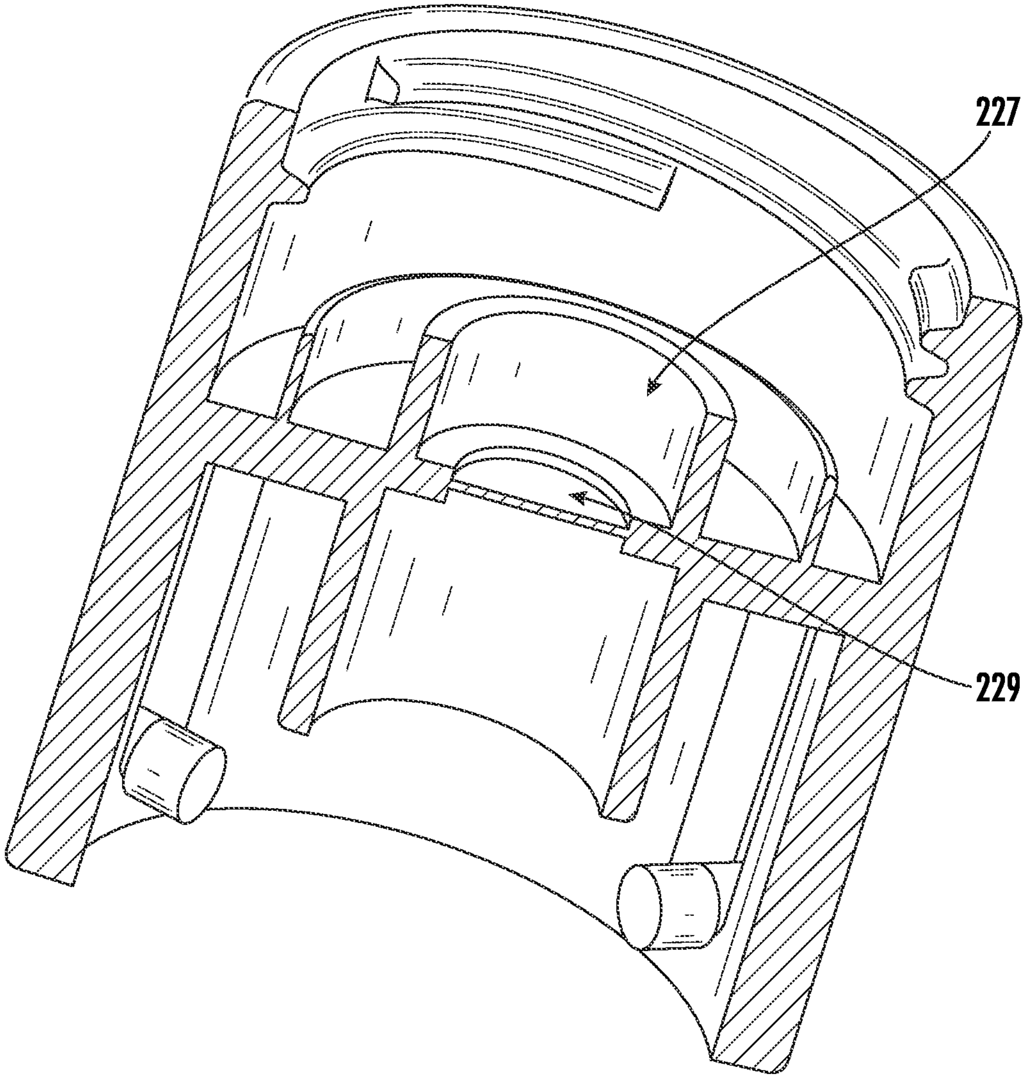
FIG. 6B is a cross-sectional view of the single-sided adapter of FIG. 6A.

FIG. 6B is a cross-sectional view of single-sided adapter 220 of FIG. 6A. FIG. 6B illustrates a pocket 227 for holding a filter that may be inserted in the pocket and an optional puncturable seal membrane 229. Puncturable seal membrane 29 may be molded in single-sided adapter 220. Puncturable seal membrane 29 also serves as a cap to hold in the liquid of the bottle prior to puncture. This eliminates the need for a primary shipping cap. Pocket 227 allows a user to push in a commercially available off-the shelf spray gun filter into single-sided adapter 220. This allows for user convenience when the product is depleted as the entire package can be discarded.

Figure 7:
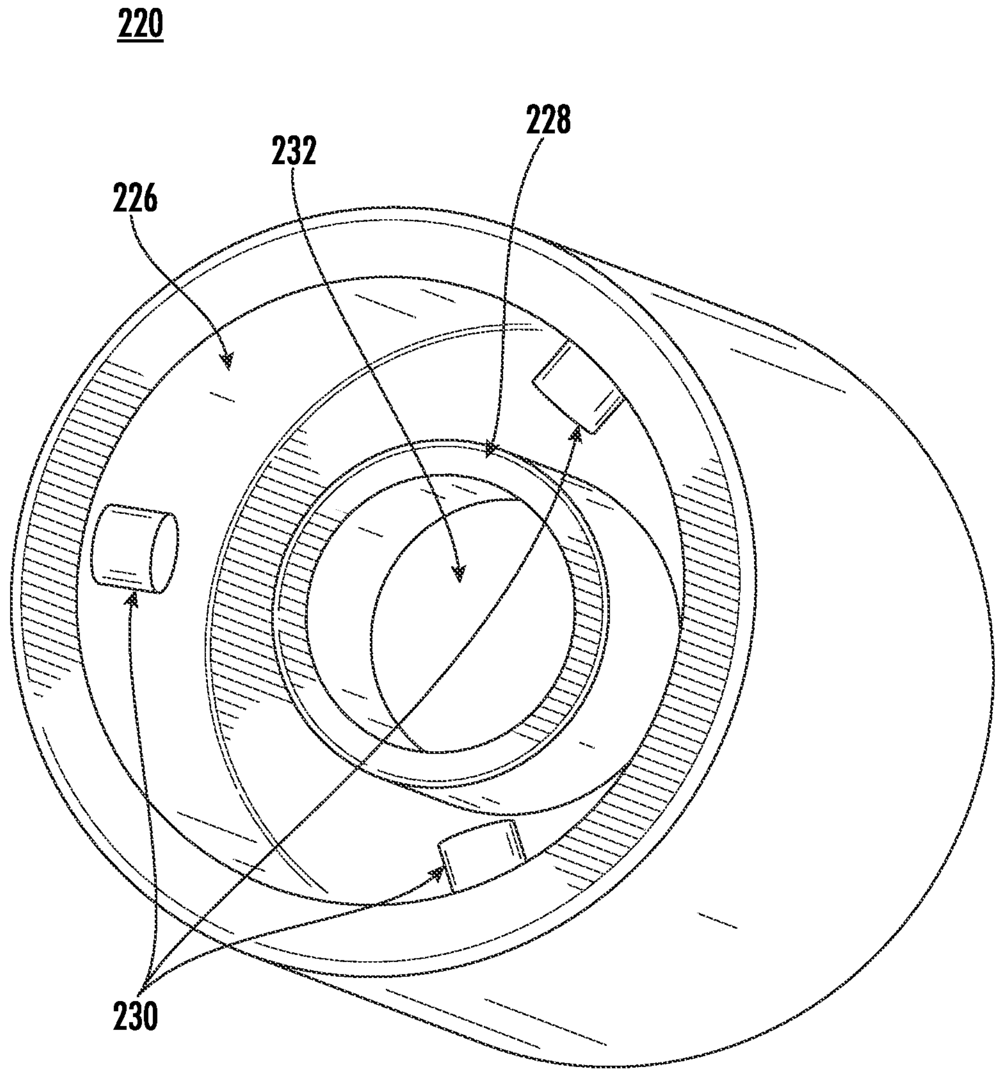
FIG. 7 is a perspective view of the spray gun assembly connection side of the single-sided adapter of FIG. 5.

FIG. 7 is a perspective view of spray gun assembly connection side 226 of single-sided adapter 220 of FIG. 5. Spray gun assembly connection side 226 as shown has three cylindrical lugs 230. Although three lugs are shown, if present, there may be any number of lugs. The configuration of spray gun assembly connection side 226 may vary. As shown in FIG. 7, the three lugs engage with a mating fitting of the spray gun assembly and provide a fluid tight seal at a cylindrical feature 228 between the bottle and the fitting when fully engaged. A central bore 232 goes through the center of single-sided adapter 220.

Figure 8:
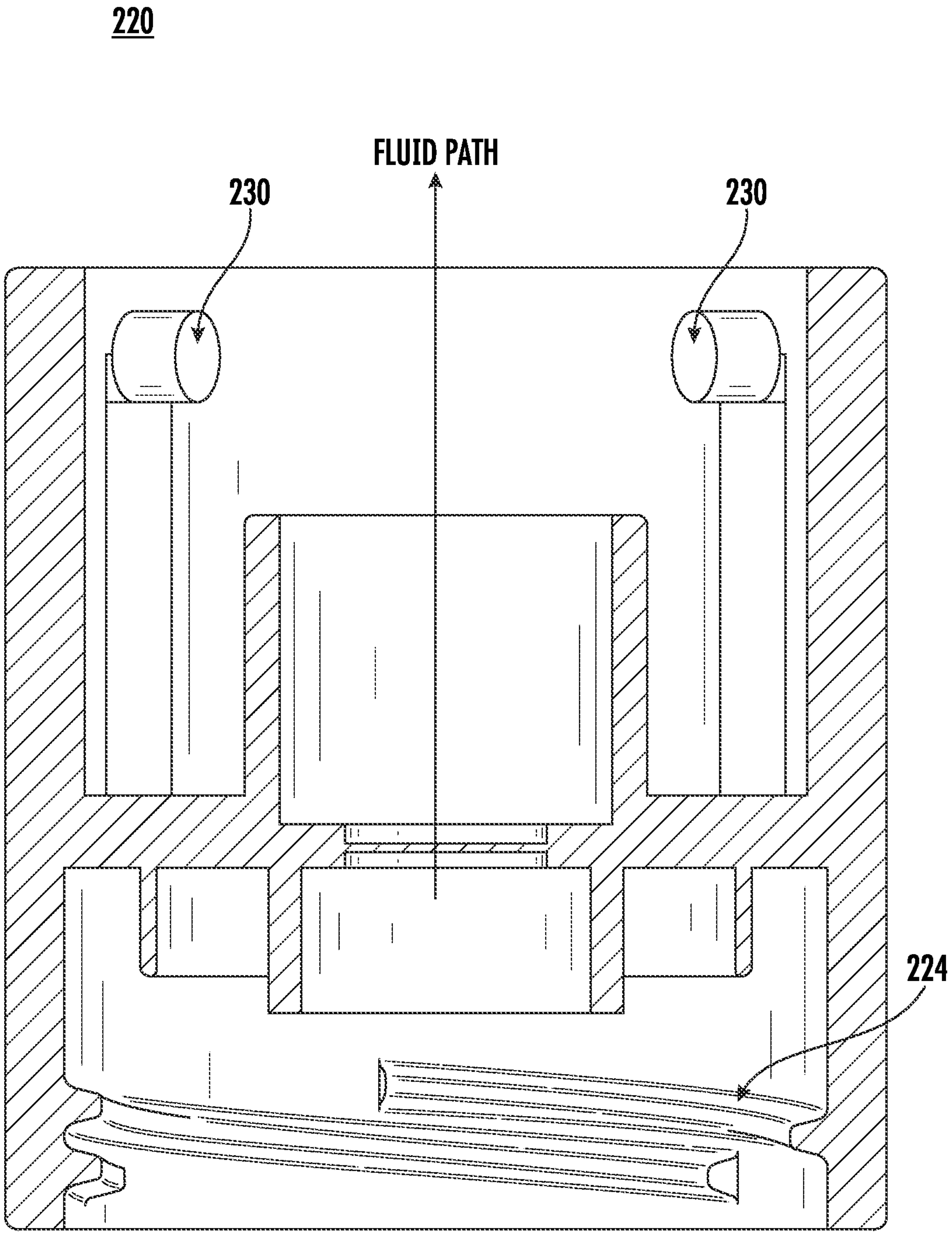
FIG. 8 is a cross-sectional view of the single-sided adapter of FIG. 5.

FIG. 8 is a cross-sectional view of single-sided adapter 220 of FIG. 5.

Cross-sectional view shows the fluid path provided between the 2 sides of the adapter.

Figure 9:
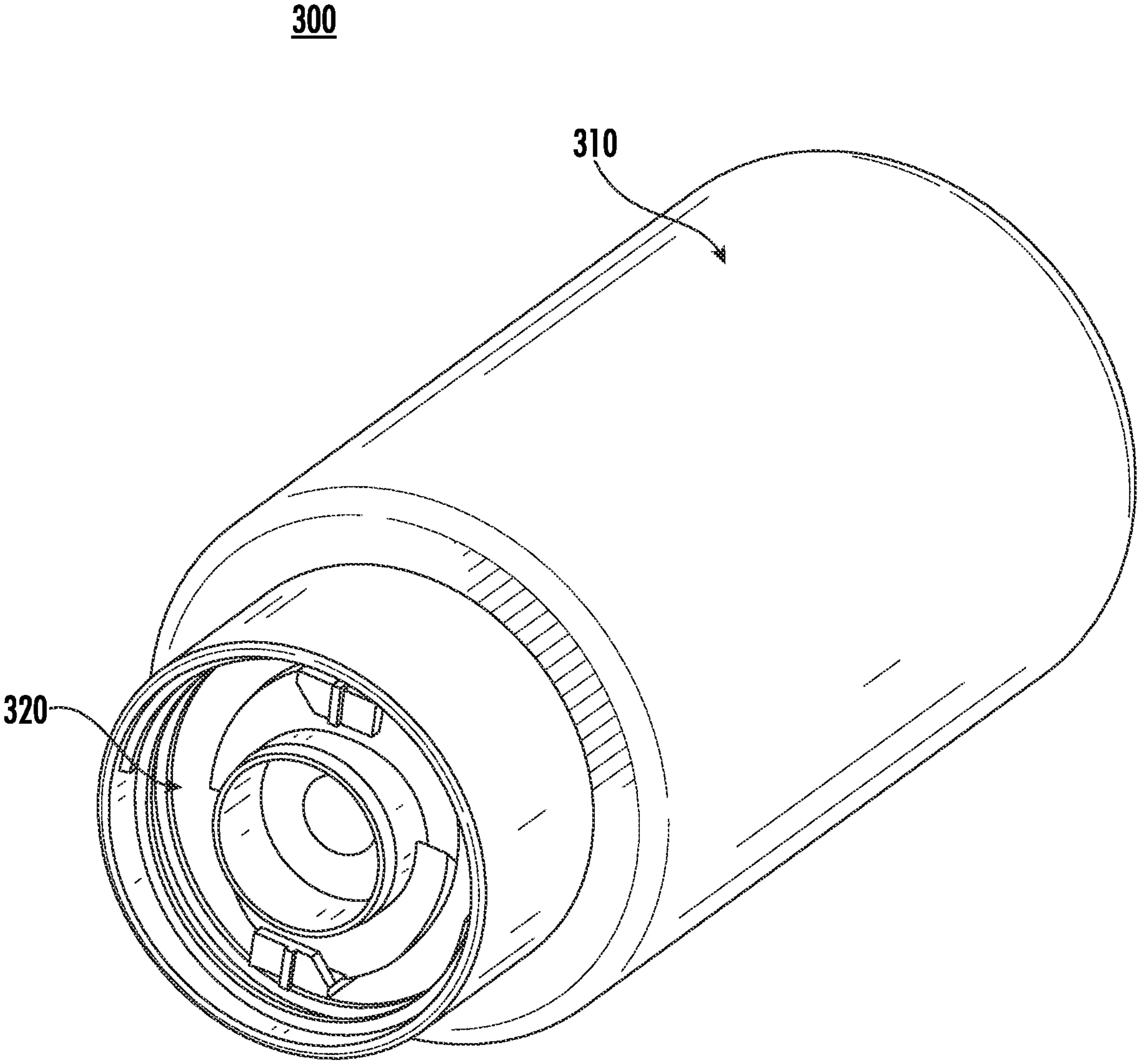
FIG. 9 is a perspective view of a ventable spray gun bottle with a dual-sided adapter in accordance with an embodiment of the present invention.

FIG. 9 is a perspective view of a spray gun bottle assembly 300 comprising a bottle 310 and a dual-sided spray gun adapter 320 in accordance with an embodiment of the present invention. Spray gun adapter 320 is reversible.

Figure 10:
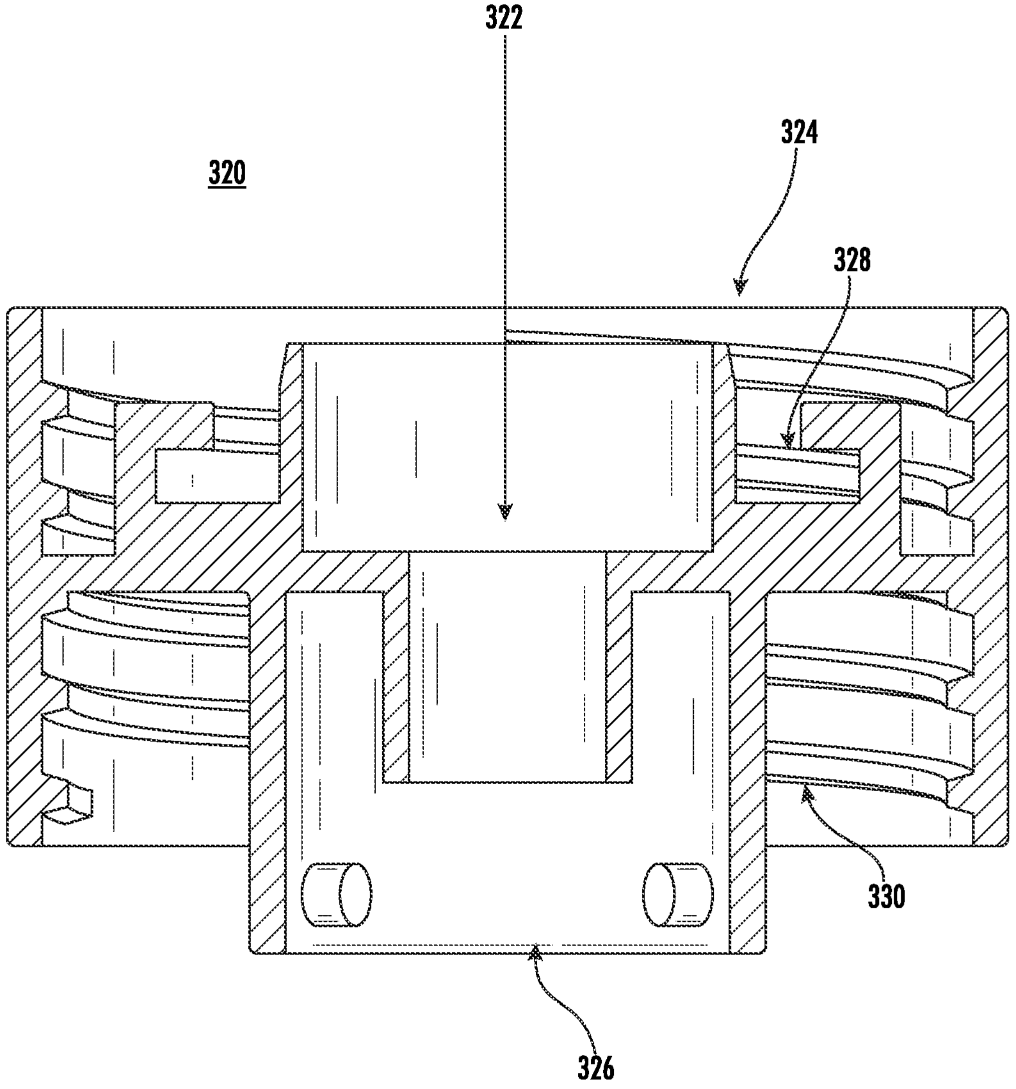
FIG. 10 is a cross-sectional view of the dual-sided adapter of FIG. 9.

FIG. 10 is a cross-sectional view of dual-sided spray gun adapter 320 of FIG. 9. FIG. 10 illustrates central bore 322 through which fluid will flow. As shown in FIG. 10, spray gun adapter 320 has a first side 324 that can be matingly received by a spray gun fitting having a first configuration and spray gun adapter 320 has an opposing second side 326 that when flipped over can be matingly received by a spray gun fitting having a different configuration. In either position, spray gun adapter 320 has internal bottle threads 328, 330 that allow connection to the bottle. For example, one side may adapt to a 3M PPS spray gun assembly fitting commercially available from 3M Products Company, and the other side may adapt to a D-Cup connector of DeVilbiss Automotive Refinishing.

Figure 11:
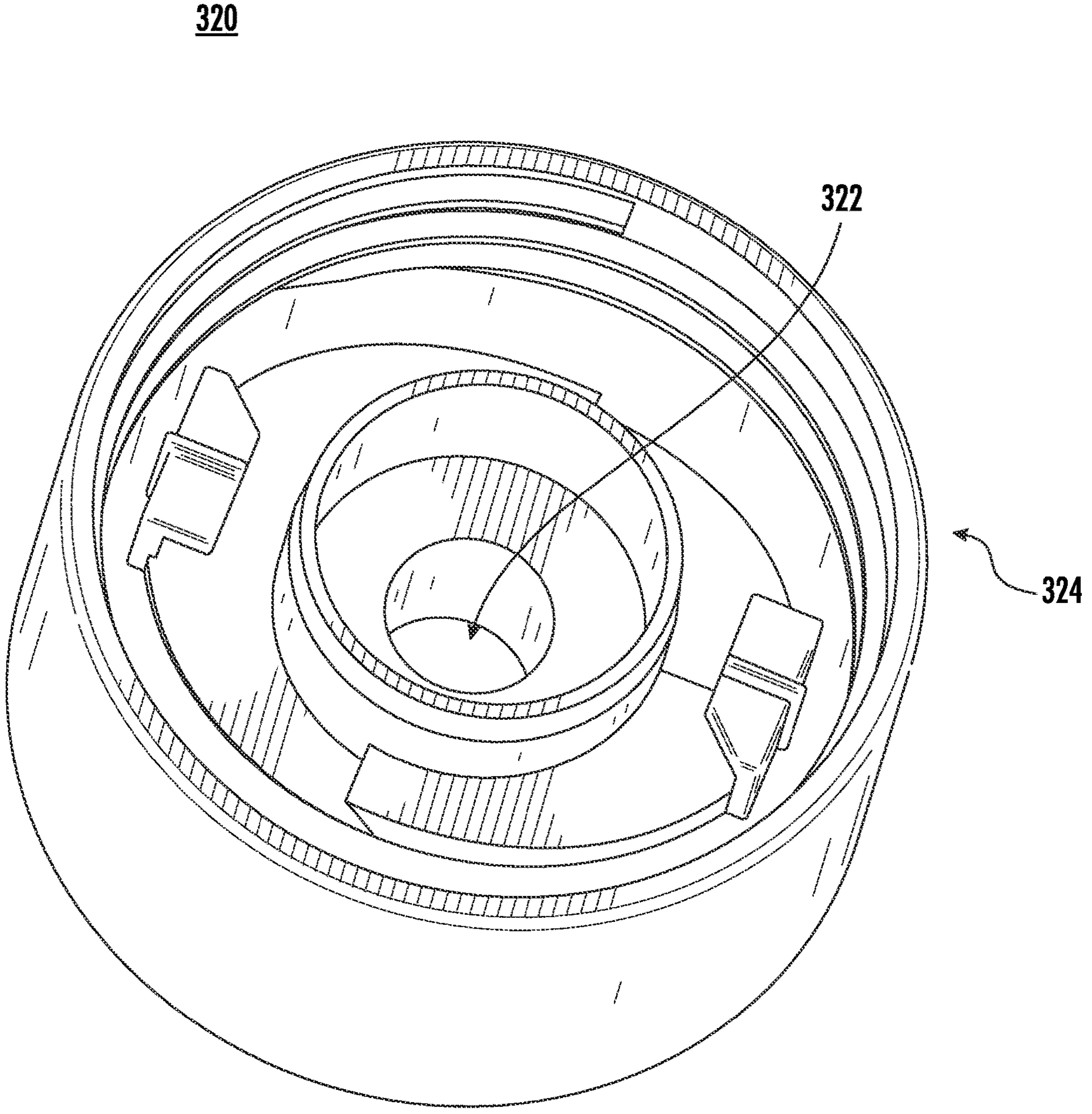
FIG. 11 is a perspective view of a first side of the dual-sided adapter of FIG. 9.
Figure 12:
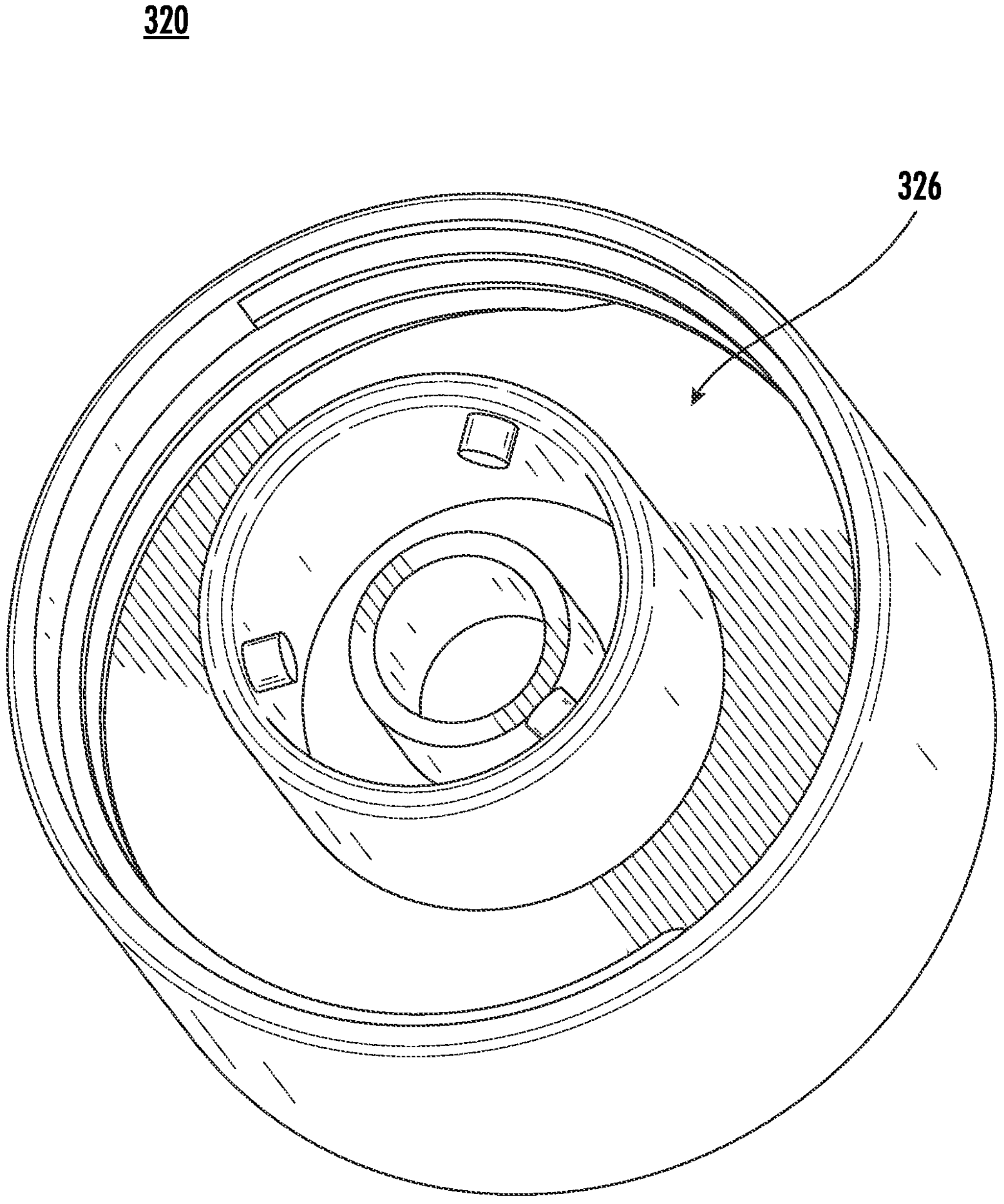
FIG. 12 is a perspective view of a second side of the dual-sided adapter of FIG. 9.

FIG. 11 is a perspective view of first side 324 of the dual-sided adapter 320 of FIG. 9 having central bore 322. FIG. 12 is a perspective view of second side 326 of dual-sided adapter 320 of FIG. 9.

Figure 13:
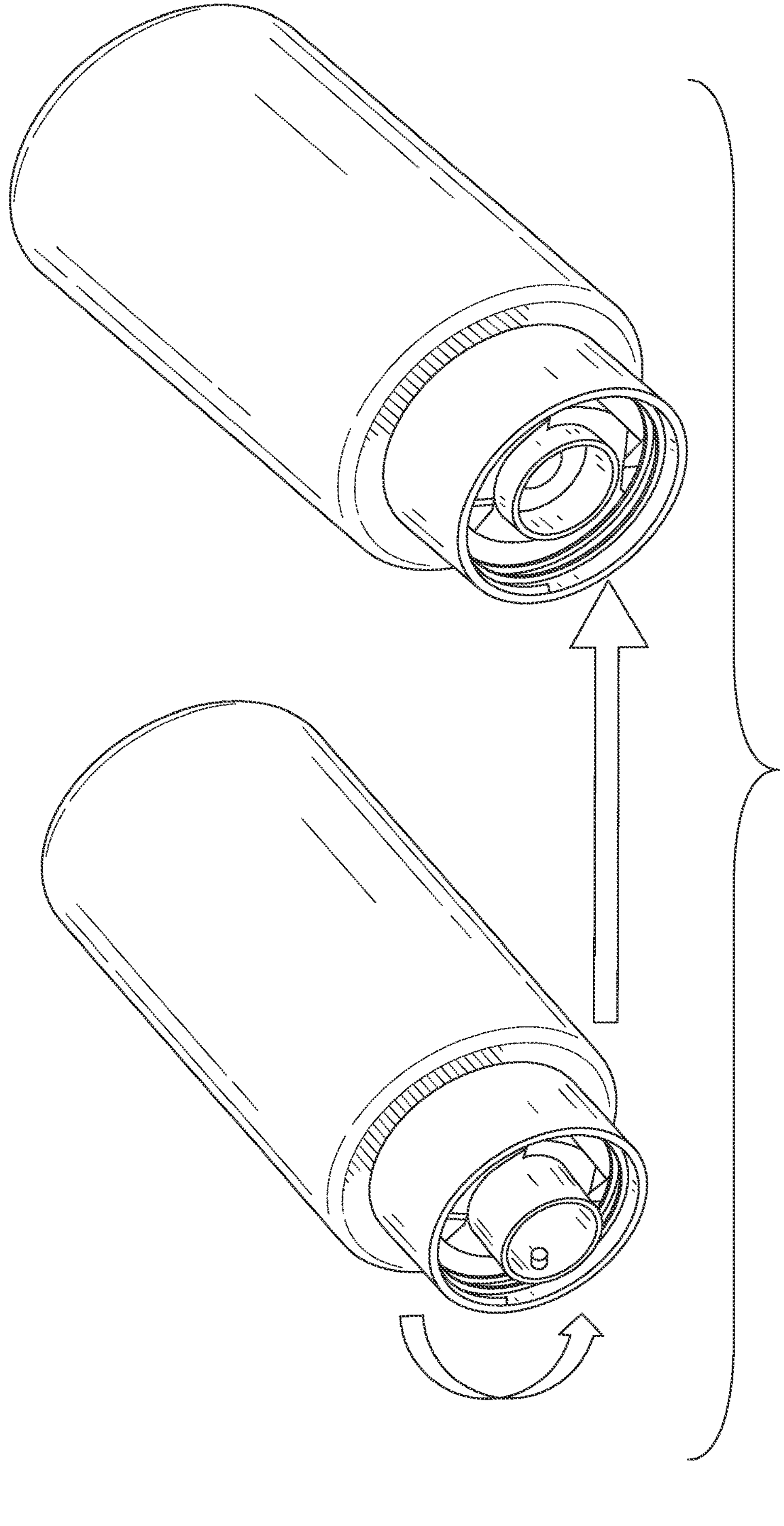
FIG. 13 illustrates the reversibility of the dual-sided adapter.

FIG. 13 illustrates the reversibility of dual-sided adapter 320 of the present invention. The dual-sided adapter is flipped to desired attachment, screwed on a threaded bottle, and clicked onto the spray gun.

Figure 14:
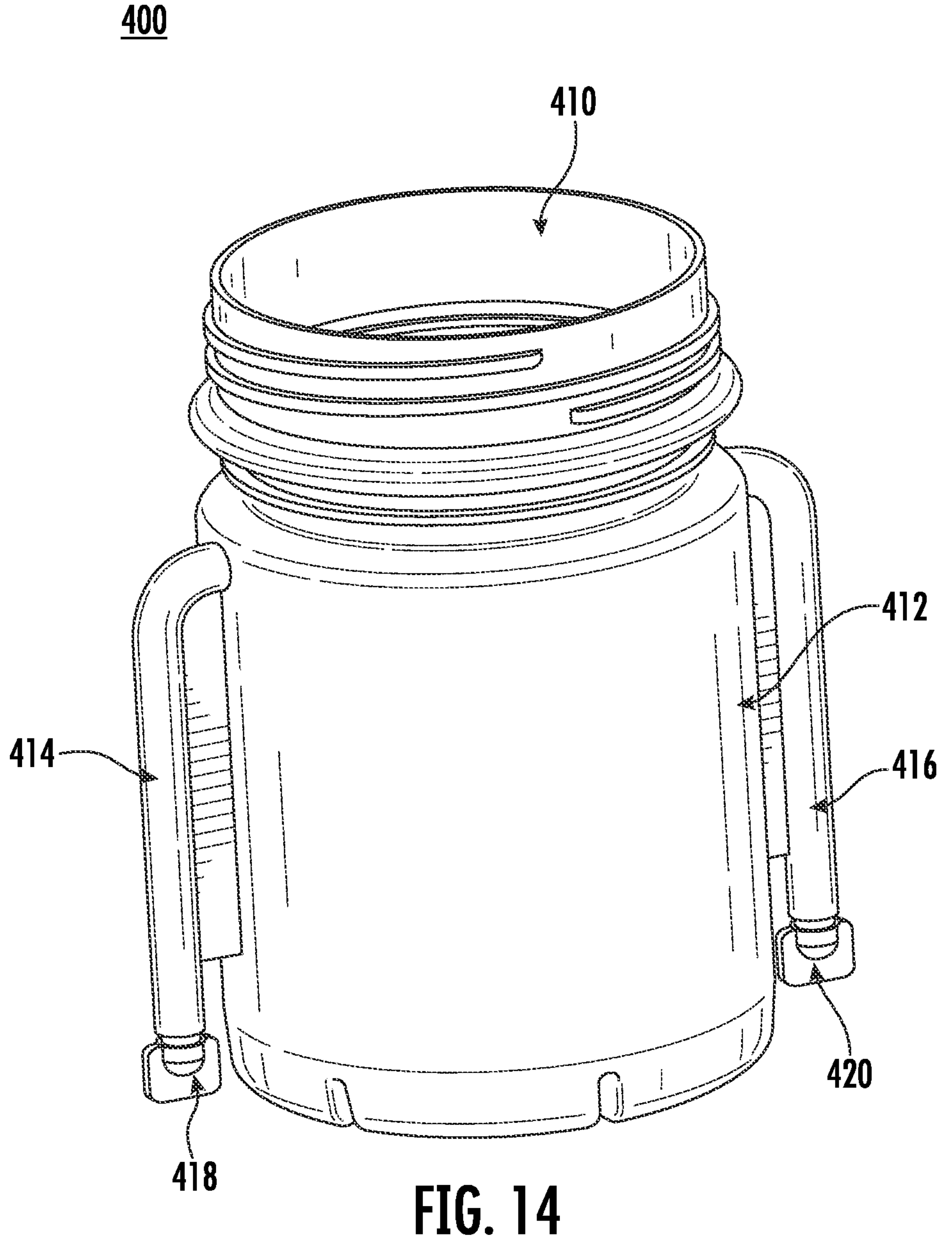
FIG. 14 is a perspective view of a spray gun bottle having two vents and tabs on the two vents intact in accordance with an embodiment of the present invention.

FIG. 14 is a perspective view of a bottle 400 having a mouth 410 which opens into a body 412 for containing a liquid, the bottle having two vents 414, 416 extending outwardly from body 412 in accordance with an embodiment of the present invention. The mouth may have a child resistant lock feature. The bottle, as shown, has vents 414, 416 being open tubes with removable ends 418, 420 with removable ends or tabs 418, 420 facing in a direction away from the mouth of the bottle. One or more tabs 418, 420 are removed for venting during operation of the spray gun. Although shown in this configuration, the number, shape, and location of vents may vary as well as the orientation of the vents. When bottle 400 is assembled onto a spray gun, the bottle vent may be twisted, snapped, or clipped open to vent the bottle. Venting the system, allows for even and consistent dispensing of liquid. The bottle vent is easy to open prior to use and allows for continuous and even spraying of liquid.

Figure 15:
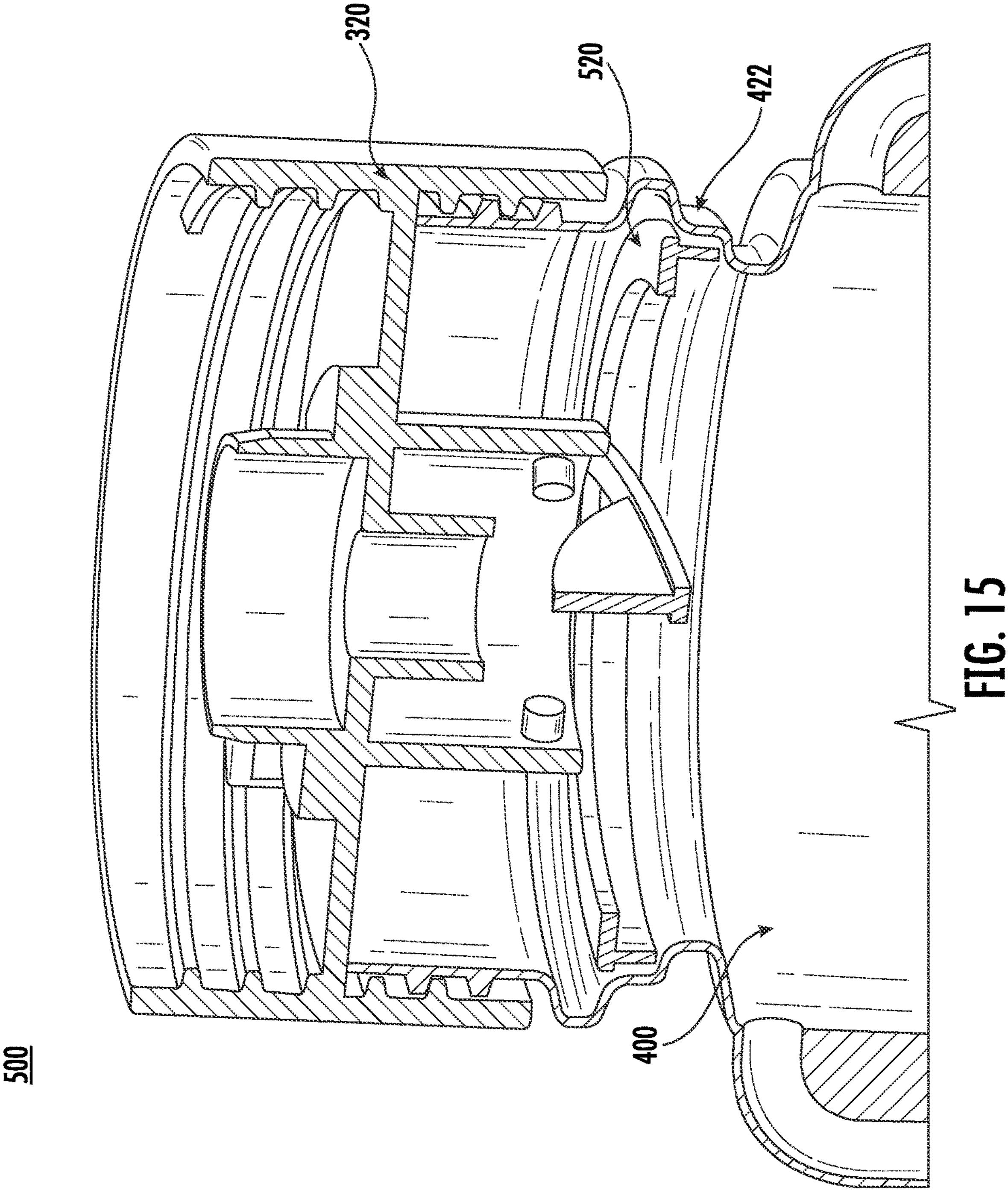
FIG. 15 is a partial cross-sectional view of the spray gun bottle of FIG. 14 attached to a dual-sided adapter in accordance with an embodiment of the present invention.

FIG. 15 is a partial cross-sectional view of spray gun bottle 400 of FIG. 14 attached to dual-sided adapter 320 in accordance with an embodiment of the present invention. FIG. 15 shows bottle 400 has a shoulder or pocket 422 for holding an optional filter 520. The pocket allows for inclusion of optional filter 520. Examples of filters for use in the invention are those commercially available from SATA GmbH & Co., Iwata-Medea, Inc, 3M Products Company, DeVilbiss Automotive Refinishing, among others. Installing a filter prevents any solids or debris in the liquid from entering and clogging the spray gun.

Figure 16:
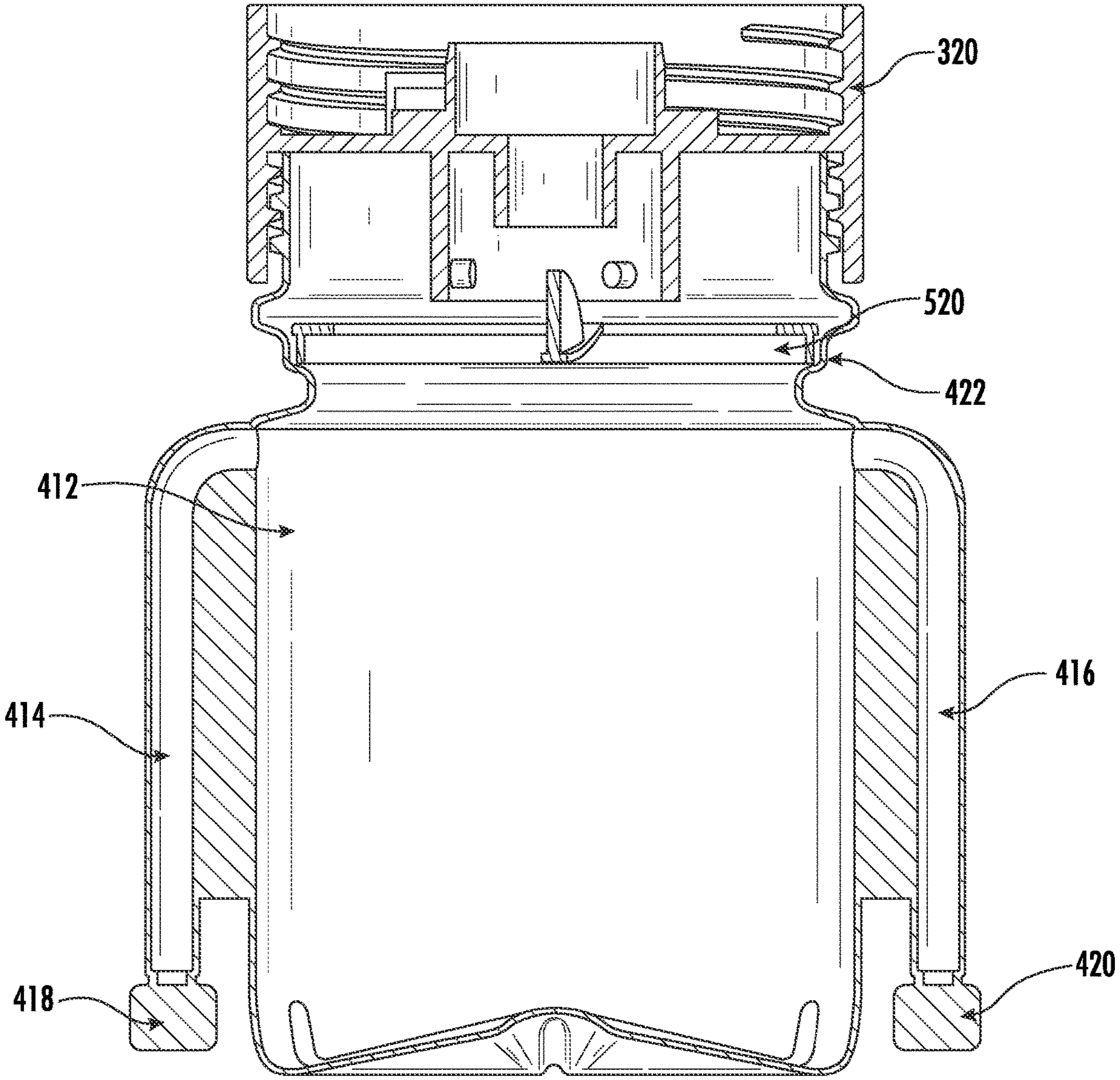
FIG. 16 is a full cross-sectional view of the spray gun bottle of FIG. 14 attached to a dual-sided adapter in accordance with an embodiment of the present invention.

FIG. 16 is a full cross-sectional view of spray gun bottle 400 of FIG. 14 attached to adapter 320 in accordance with an embodiment of the present invention.

Figure 17:
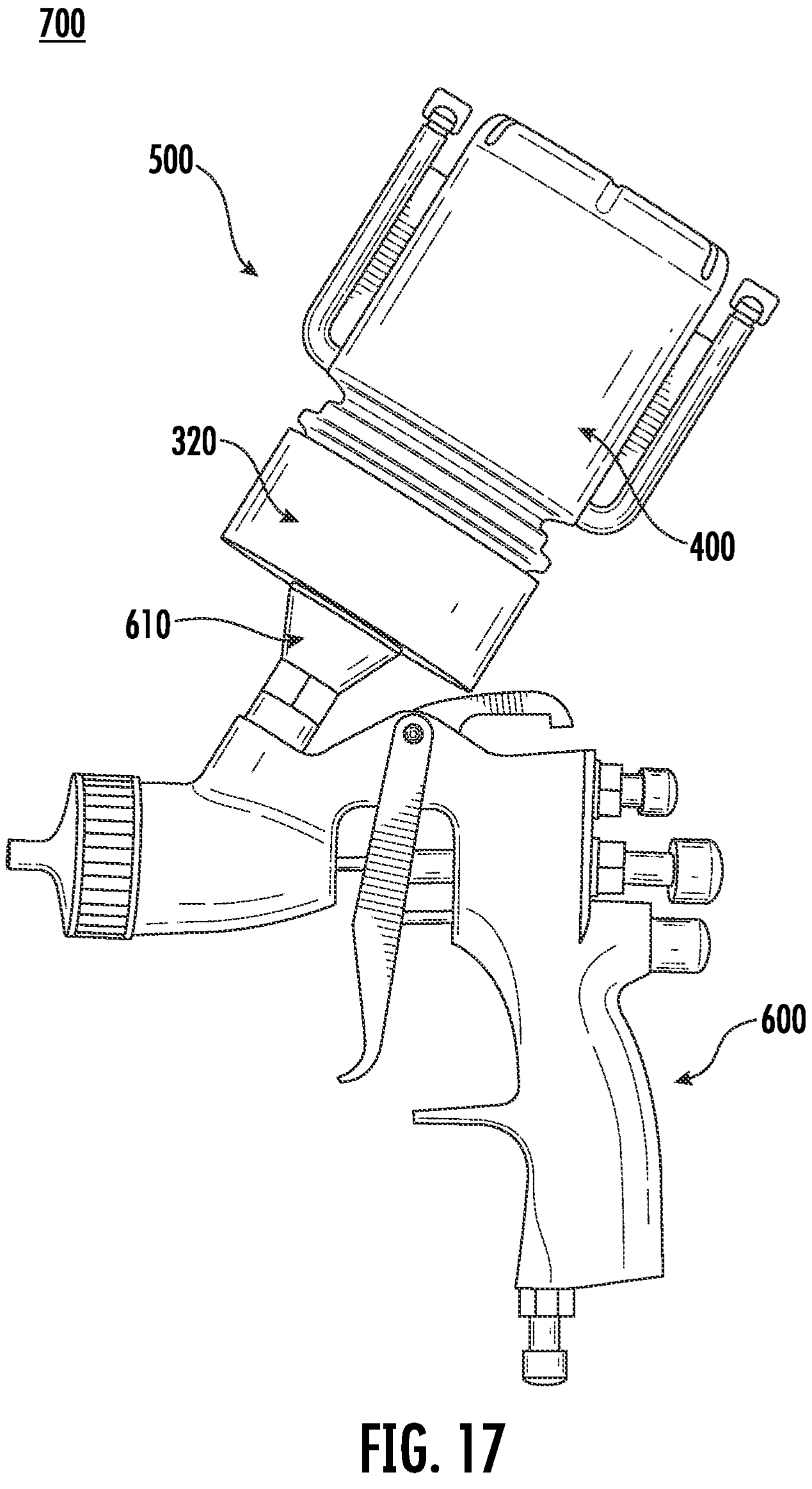
FIG. 17 is a perspective view of the spray gun bottle with vent tabs intact of FIG. 14 attached to a dual-sided adapter and to a spray gun assembly in accordance with an embodiment of the present invention.

FIG. 17 is a perspective view of a spray gun assembly 700 comprised of a bottle assembly 500 and a spray gun assembly 600. Dual-sided spray gun adapter 320 of bottle assembly 500 has a first side being attached to spray gun bottle 400 and an opposing second side being attached to a fitting 610 of spray gun assembly 600.

Figure 18:
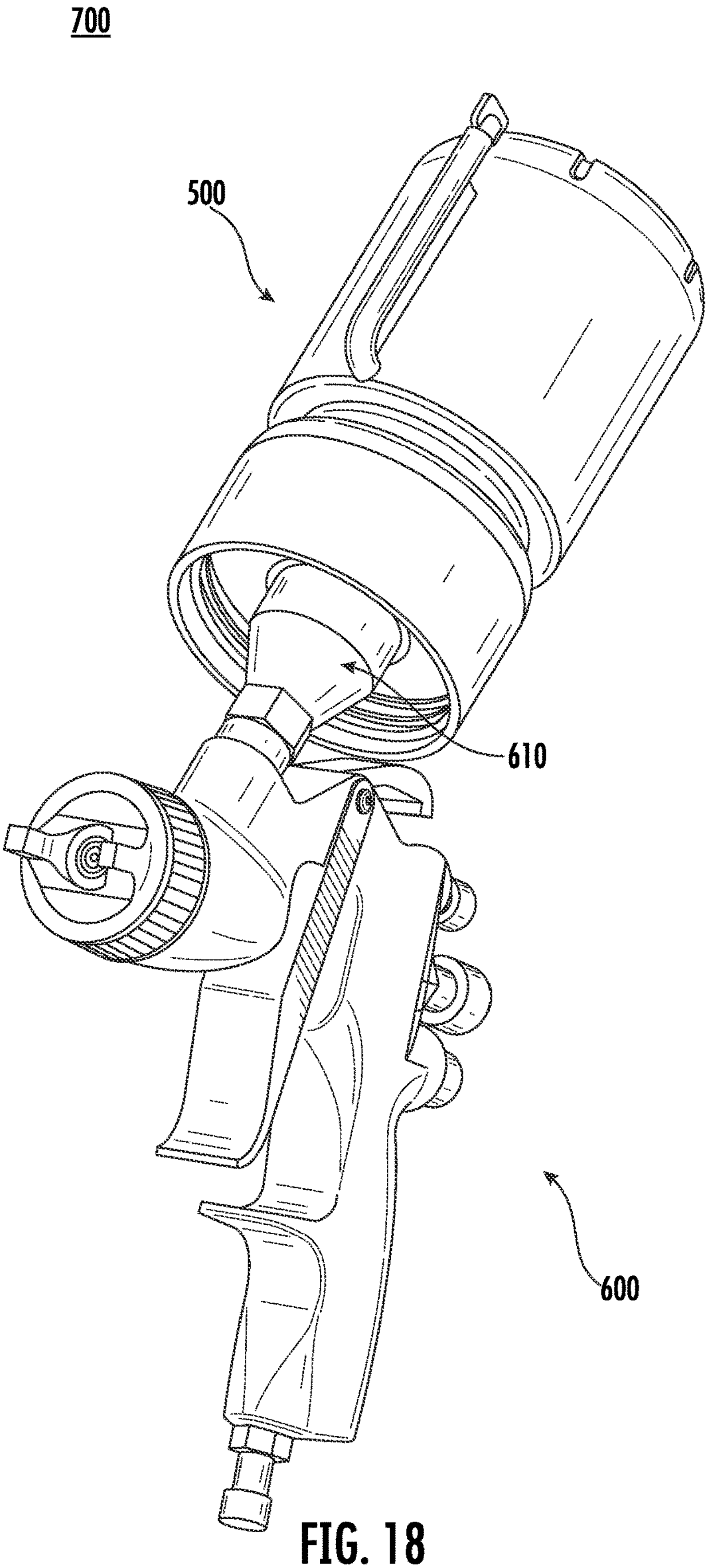
FIG. 18 is a side view of the spray gun bottle with vent tabs intact of FIG. 14 attached to a dual-sided adapter and to a spray gun assembly in accordance with an embodiment of the present invention.

FIG. 18 is a side view of bottle assembly 500 attached to spray gun assembly 600 in accordance with an embodiment of the present invention. FIG. 18 shows how the system of the present invention interfaces/connects with spray gun assembly 600 which may be a High Volume, Low Pressure (HVLP) spray gun. Bottle assembly 500 of the present invention connects to universal fittings for spray guns such as those available commercially from 3M Products Company and DeVilbiss Automotive Refinishing.

Figure 19:
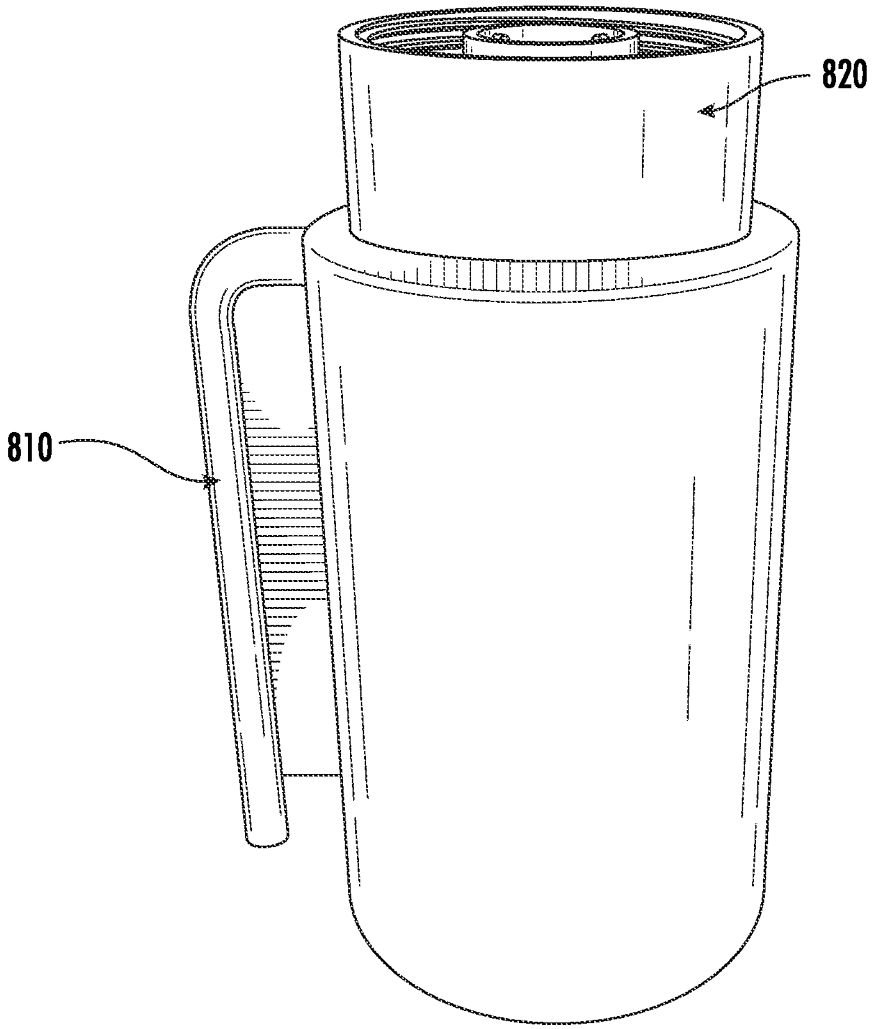
FIG. 19 is a view of a spray gun bottle having a single vent with a dual-sided adapter in accordance with an embodiment of the present invention

FIG. 19 is a view of a spray gun bottle assembly 800 comprised of a bottle with single vent 810 attached to a dual-sided adapter 820 in accordance with an embodiment of the present invention.

Figure 20:
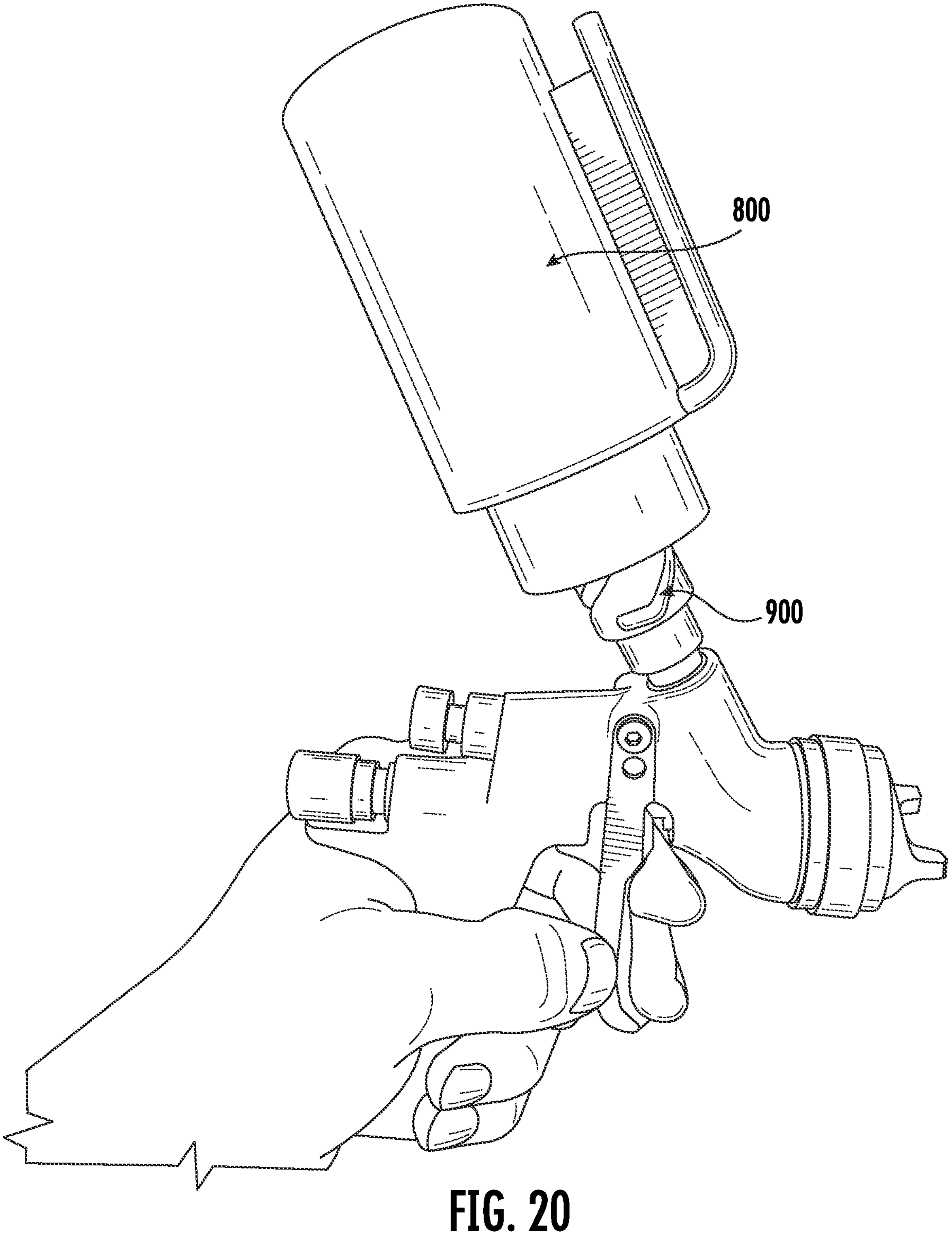
FIG. 20 is a view of the spray gun bottle of FIG. 19 attached to a first side of a dual-sided adapter and the opposing side of the dual-sided adapter attached to a spray gun assembly.
Figure 21A:
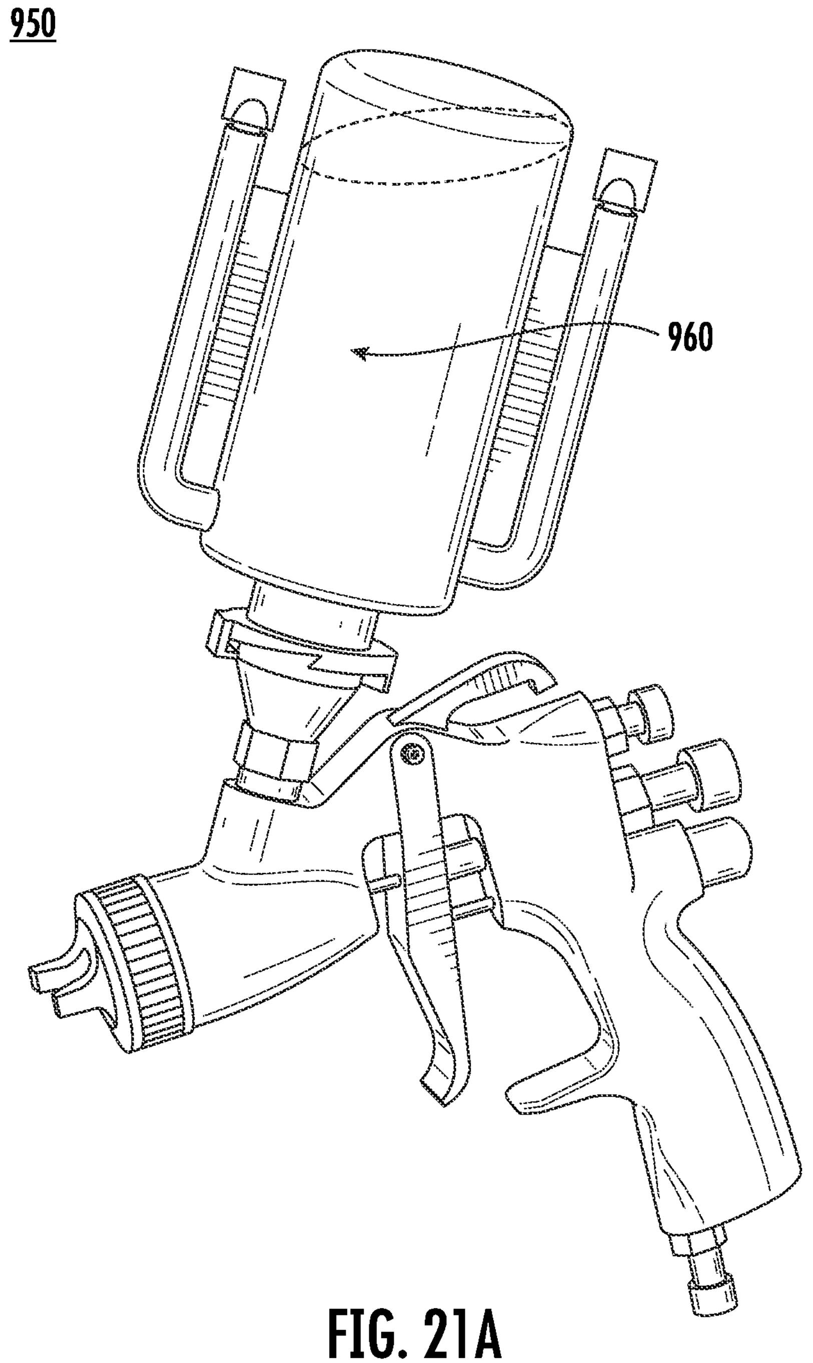
FIGS. 21A, 21B, 21C, and 21D are several views of a spray gun bottle assembly 950 with a transparent spray gun bottle 960 with vent tabs intact in an embodiment of the invention.
Figure 21B:
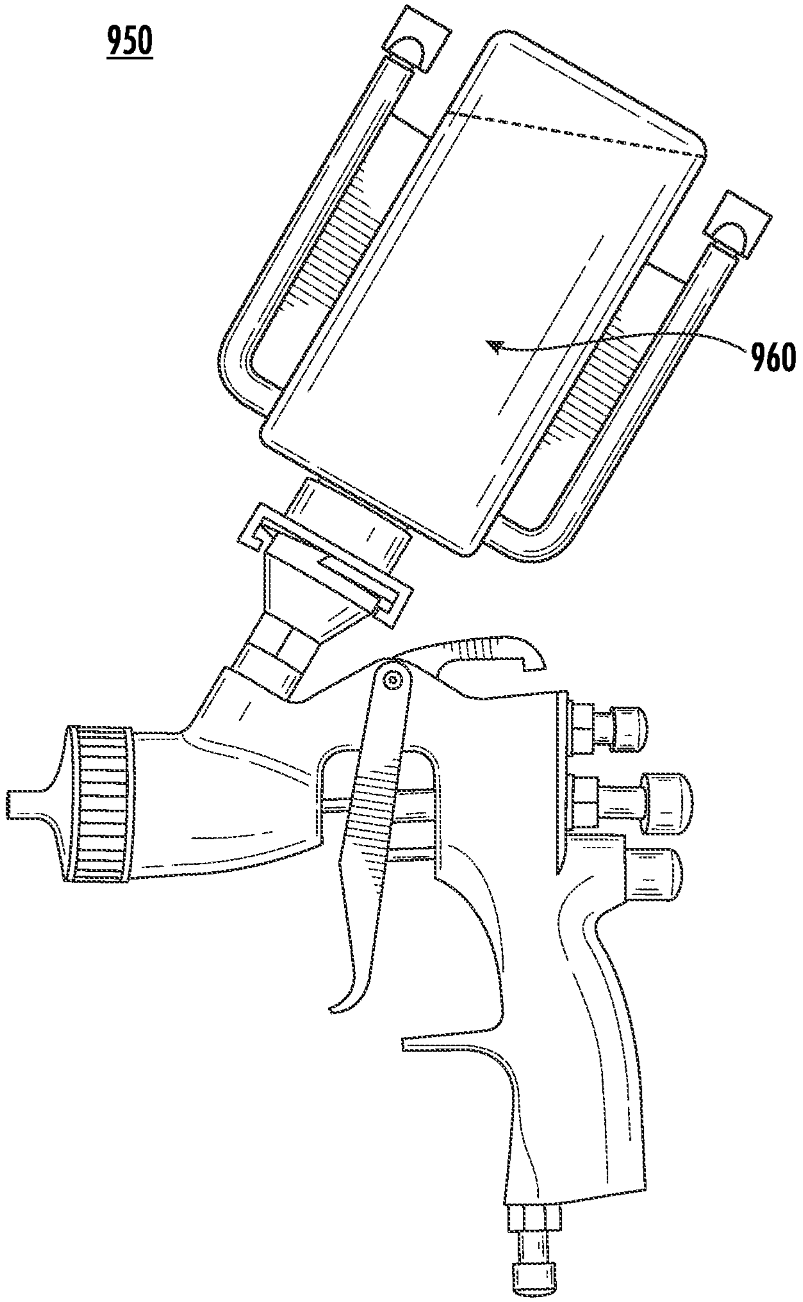
Figure 21C:
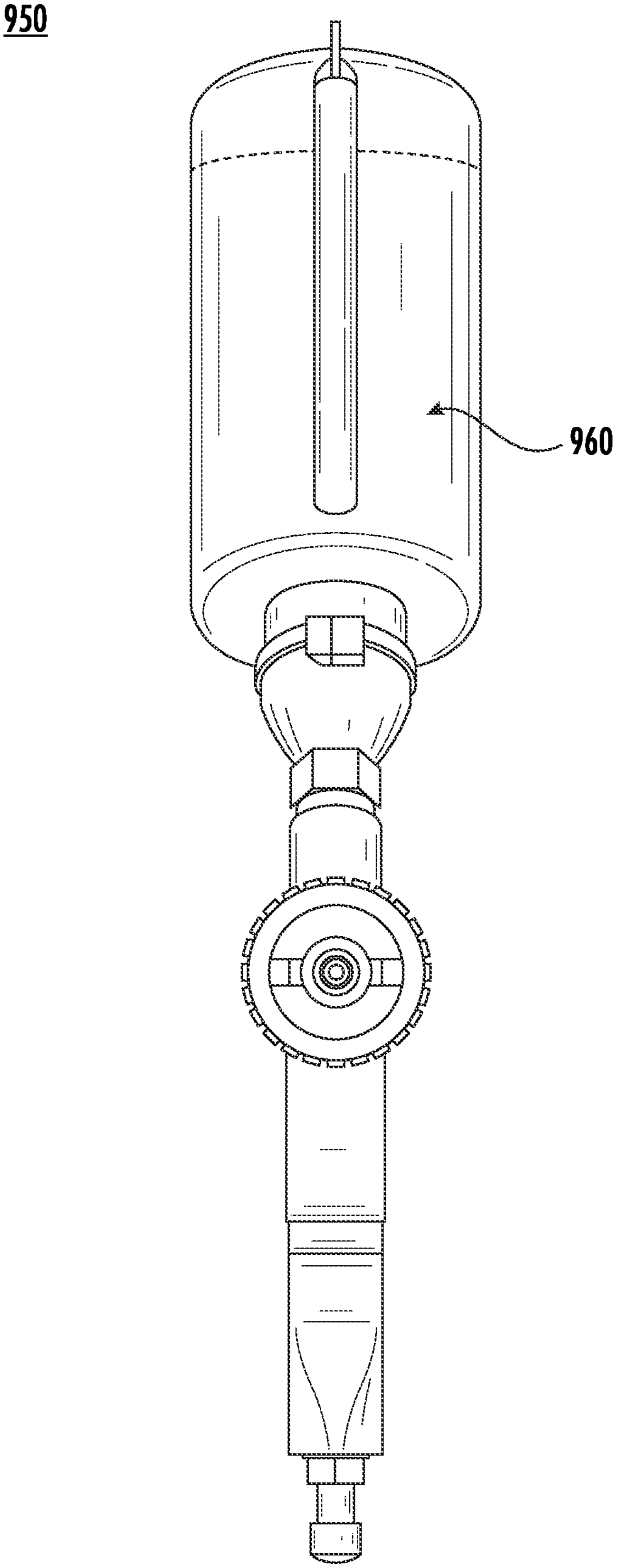
Figure 21D:
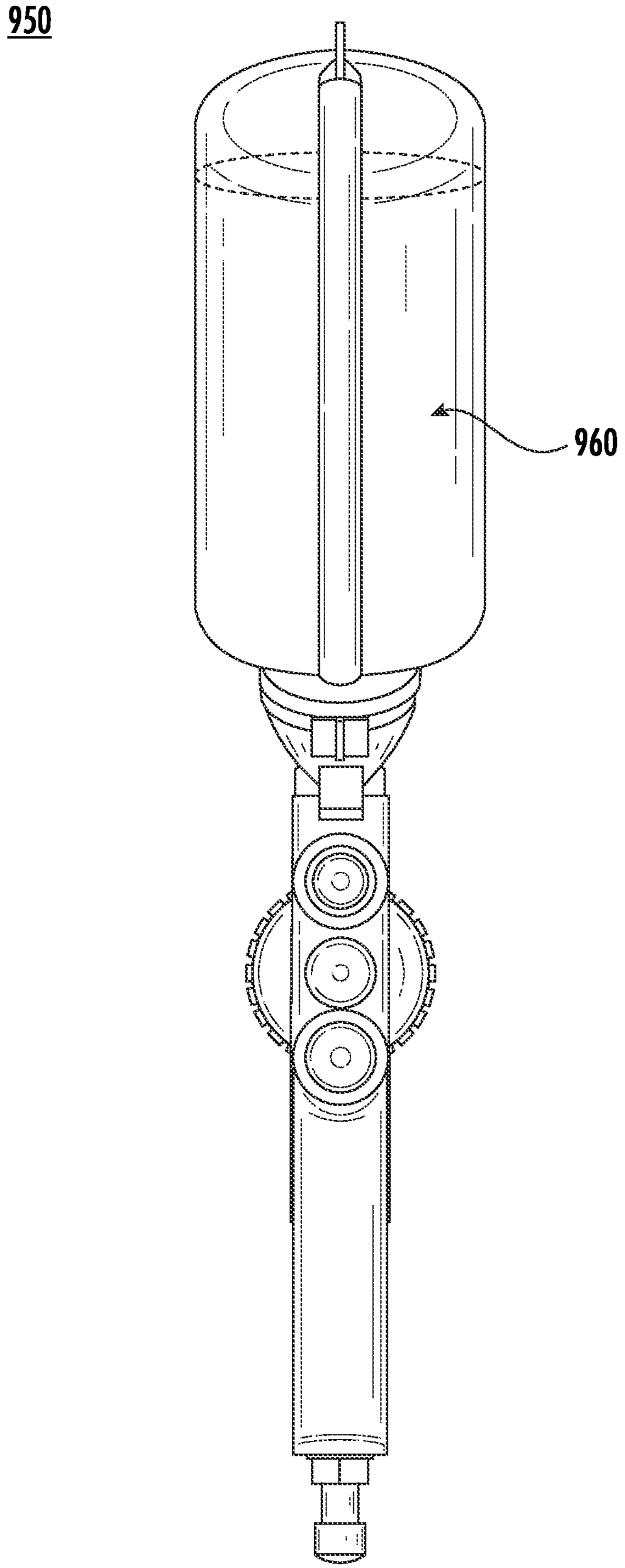

FIG. 20 is a view of spray gun bottle assembly 800 of FIG. 19 attached to a spray gun assembly 900.

FIGS. 21A, 21B, 21C and 21D are several views of a spray gun bottle assembly 950 with a transparent spray gun bottle 960 in an embodiment of the invention.

Figure 22:
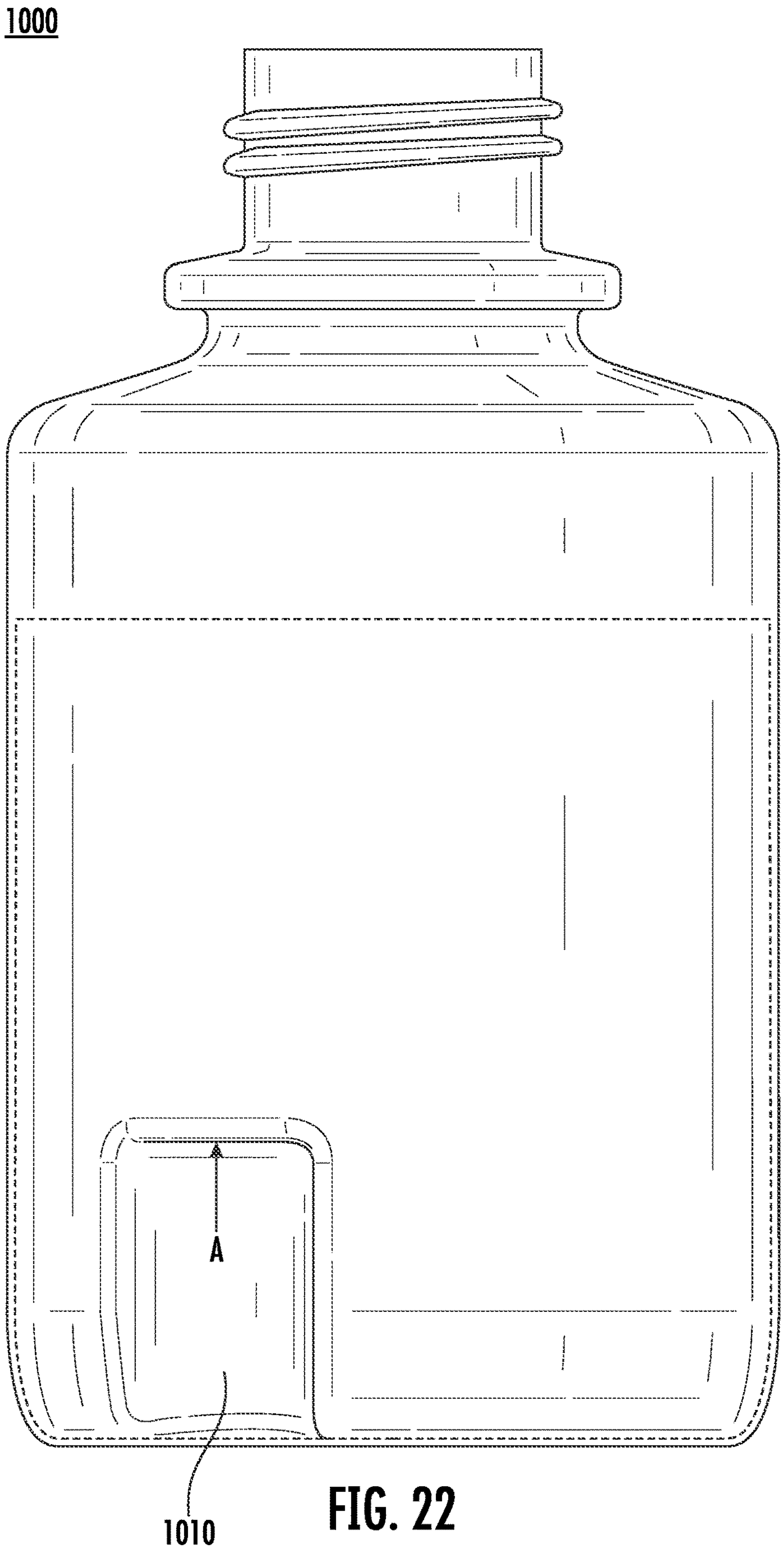
FIG. 22 is a view of a bottle having a pierceable recessed indent(s) near the bottom of bottle in accordance with an embodiment of the invention.

In an embodiment of the invention, as shown in FIG. 22, a bottle 1000 having a recessed indent(s) 1010 near the bottom of bottle 1000 is provided. Bottle 1000 as shown contains fluid with the fluid being indicated by the dashed lines as being at a full level. Instead of vents extending outwardly from body to provide the venting function, one or more recessed indent(s) 1010 are preferably present in the bottom half of the bottle. Indent(s) 1010 are pierceable such that a user can attach the bottle to a spray gun and pierce the indent(s). The bottle can be of any size but a bottle with 6 oz. is typically sufficient to coat a vehicle bumper, for example. The pierced bottle will then vent when the spray gun is in use Once the spraying is completed, a user can, for example, place the bottle back on a surface such as a table. Extra formula that is not used, such as below 2 oz., will remain in the bottle and not leak out. The bottle may be blow molded using PET plastic.

Figure 23:
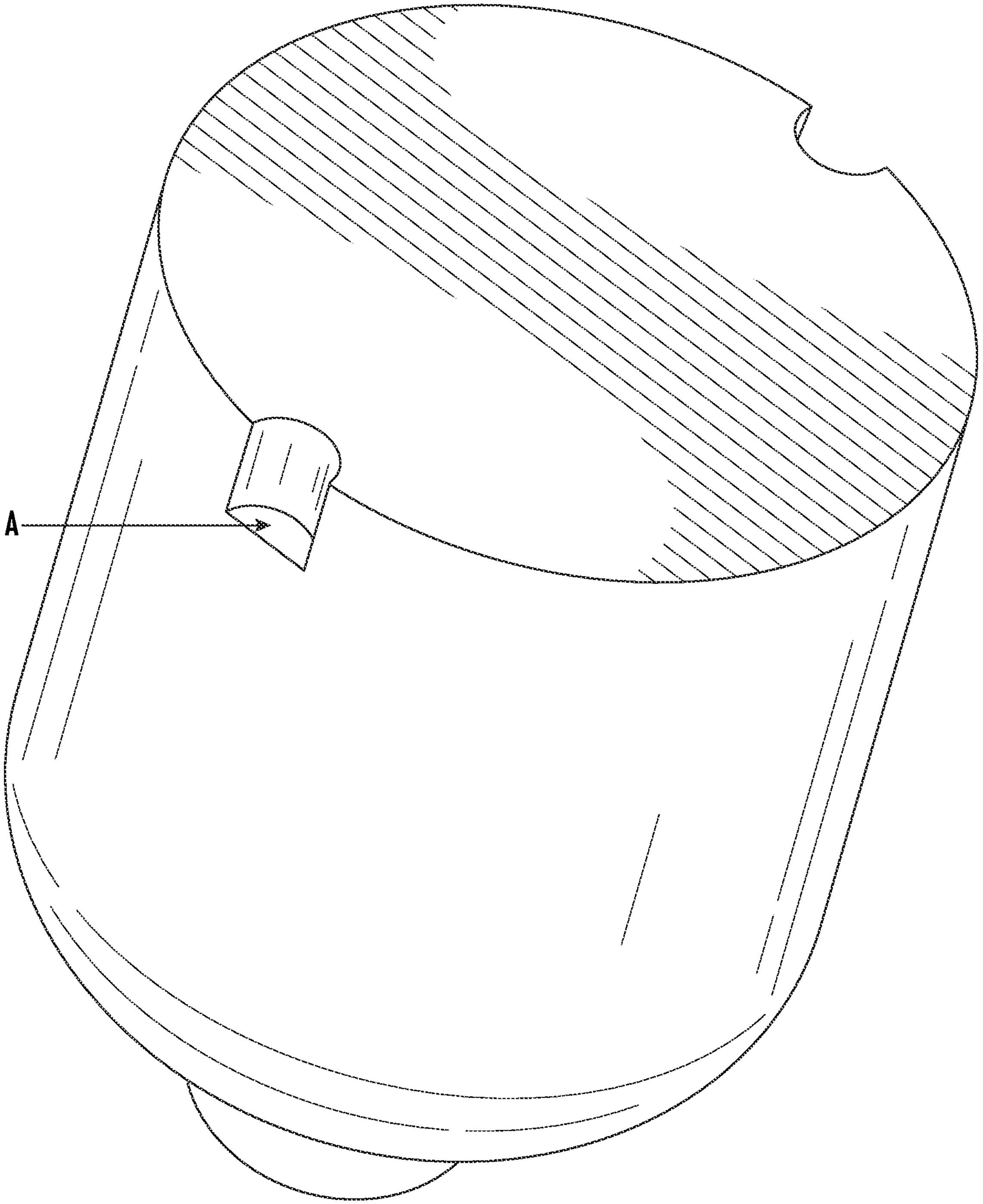
FIG. 23 is a bottom view of the bottle of FIG. 22 showing the location of the pierceable recessed indent(s).

FIG. 23 is a bottom view of the bottle of FIG. 22 showing the location of the pierceable recessed indent(s) at point A.

Figure 24:
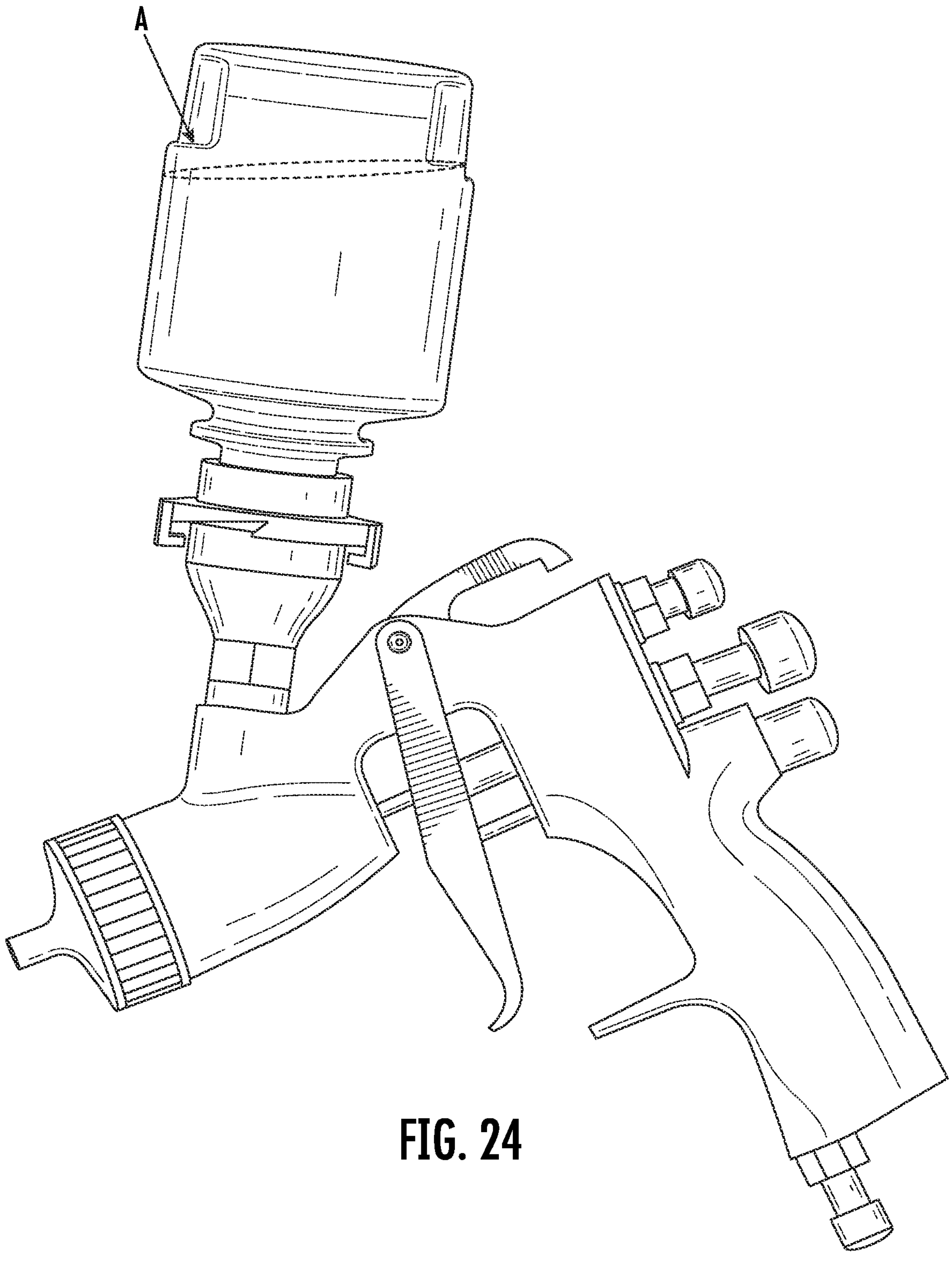
FIG. 24 is an illustration of the bottle of FIG. 22 attached to a first side of a single-sided adapter and an opposing side of the single-sided adapter attached to the spray gun.

FIG. 24 is an illustration of the bottle of FIG. 22 attached to a first side of a single-sided adapter and an opposing side of the single-sided adapter attached to the spray gun.

Figure 25:
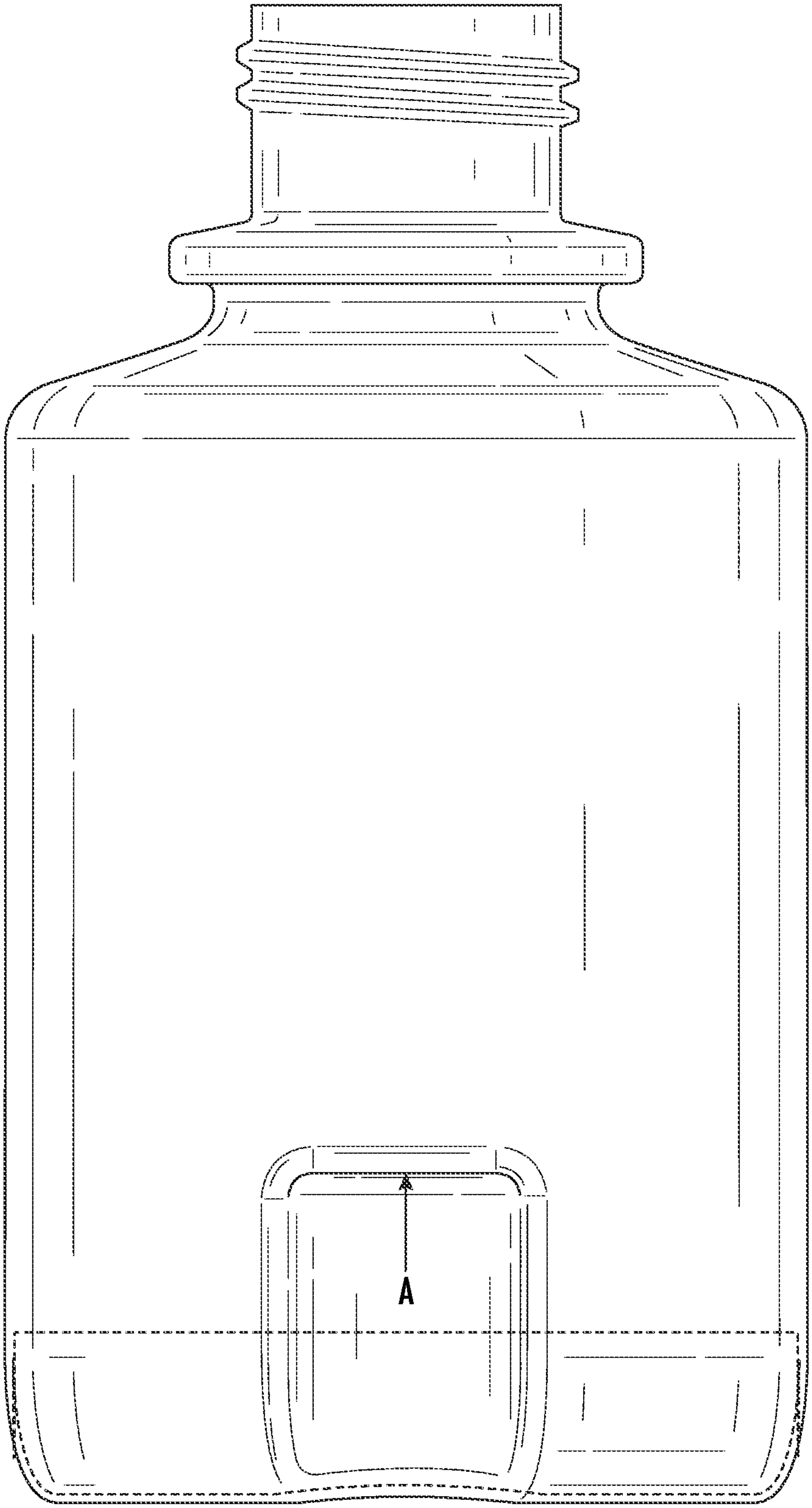
FIG. 25 is an illustration of the bottle with residual fluid line below where the bottle is pierced.

FIG. 25 is an illustration of the bottle with residual fluid left after spraying. The dashed lines indicate the residual fluid line below where the bottle is pierced at point A.

Figure 26:
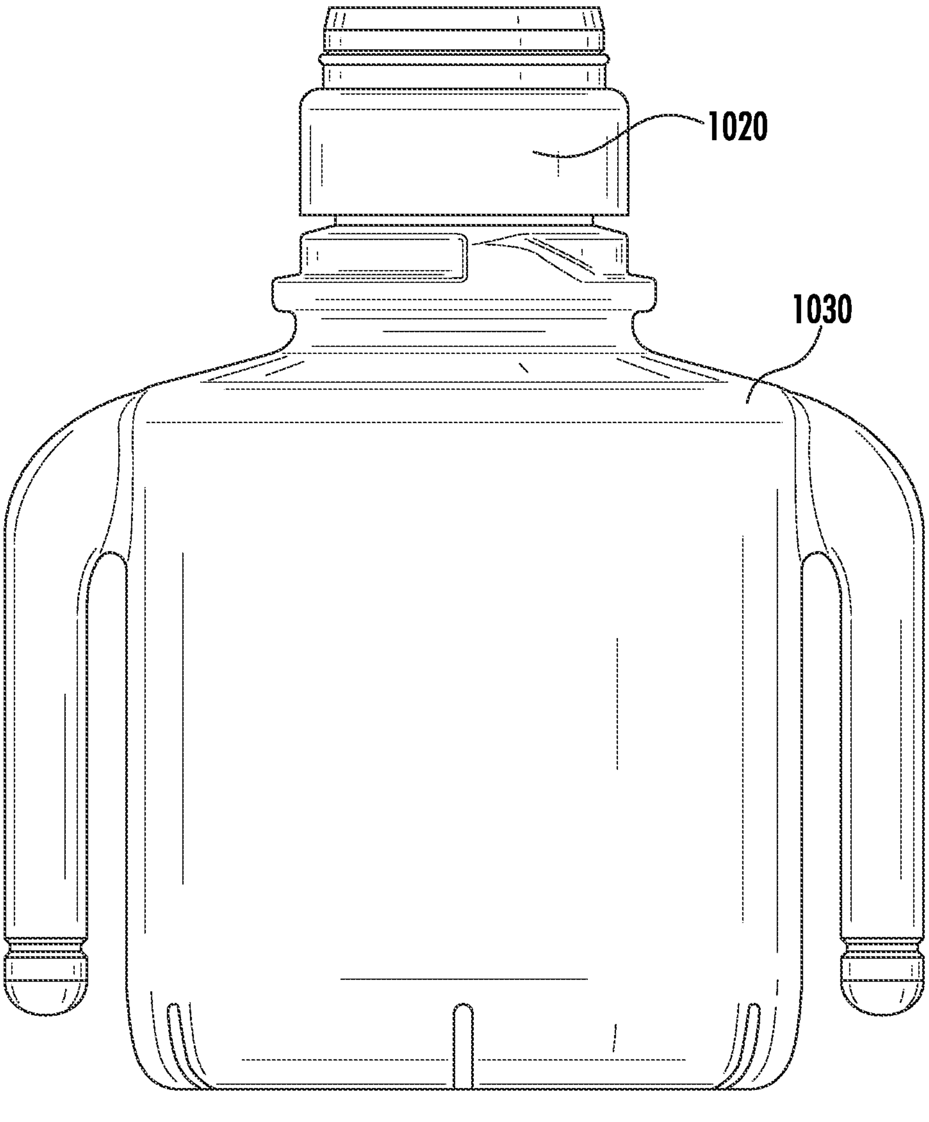
FIG. 26 illustrates a bottle attached to a first side of a single-sided adapter and an opposing side of the single-sided adapter having press in or friction fit attachment to the spray gun. The single-sided adapter shown serves two purposes as a cap for the bottle and a connector to a spray gun in accordance with an embodiment of the present invention.

FIG. 26 illustrates a bottle 1030 attached to a first side of a single-sided adapter 1020 and an opposing side of single-sided adapter 1020 having press in or friction fit attachment to a spray gun. Single-sided adapter 1020 shown serves two purposes as a cap for bottle 1030 and a connector to the spray gun.

Figure 27:
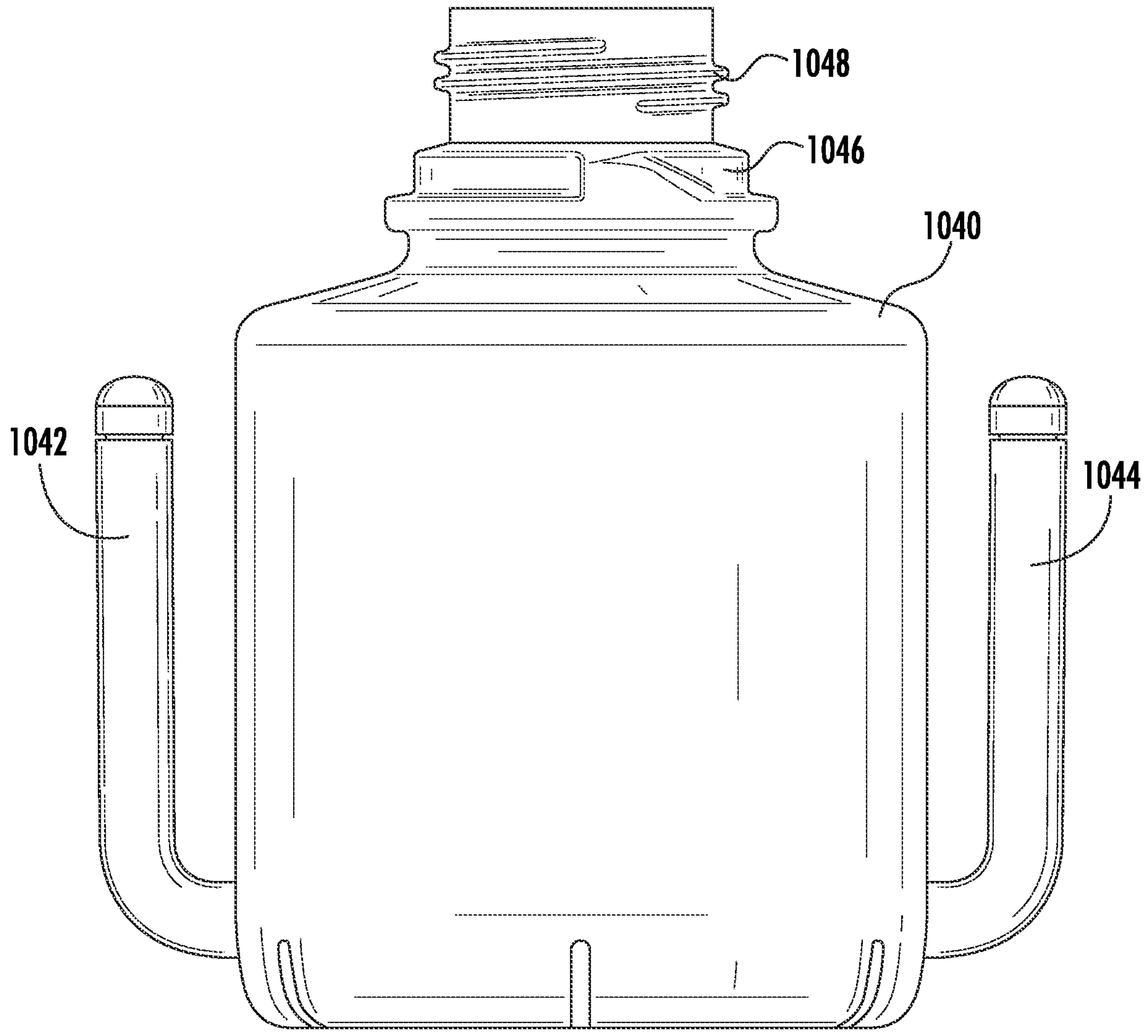
FIG. 27 illustrates a bottle having vents pointing in an opposite direction then as shown in FIG. 26 and having a child resistant lug below the threads on the mouth of the bottle in accordance with an embodiment of the present invention.

FIG. 27 illustrates a bottle 1040 having vents 1042, 1044 pointing in an opposite direction then as shown in FIG. 26 and having a child resistant lug 1046 below the threads 1048 on the mouth of bottle 1040. In this vent orientation, it is preferred that the tubular vents protrude from the body of the bottle below the halfway point of the bottle.

Figure 28:
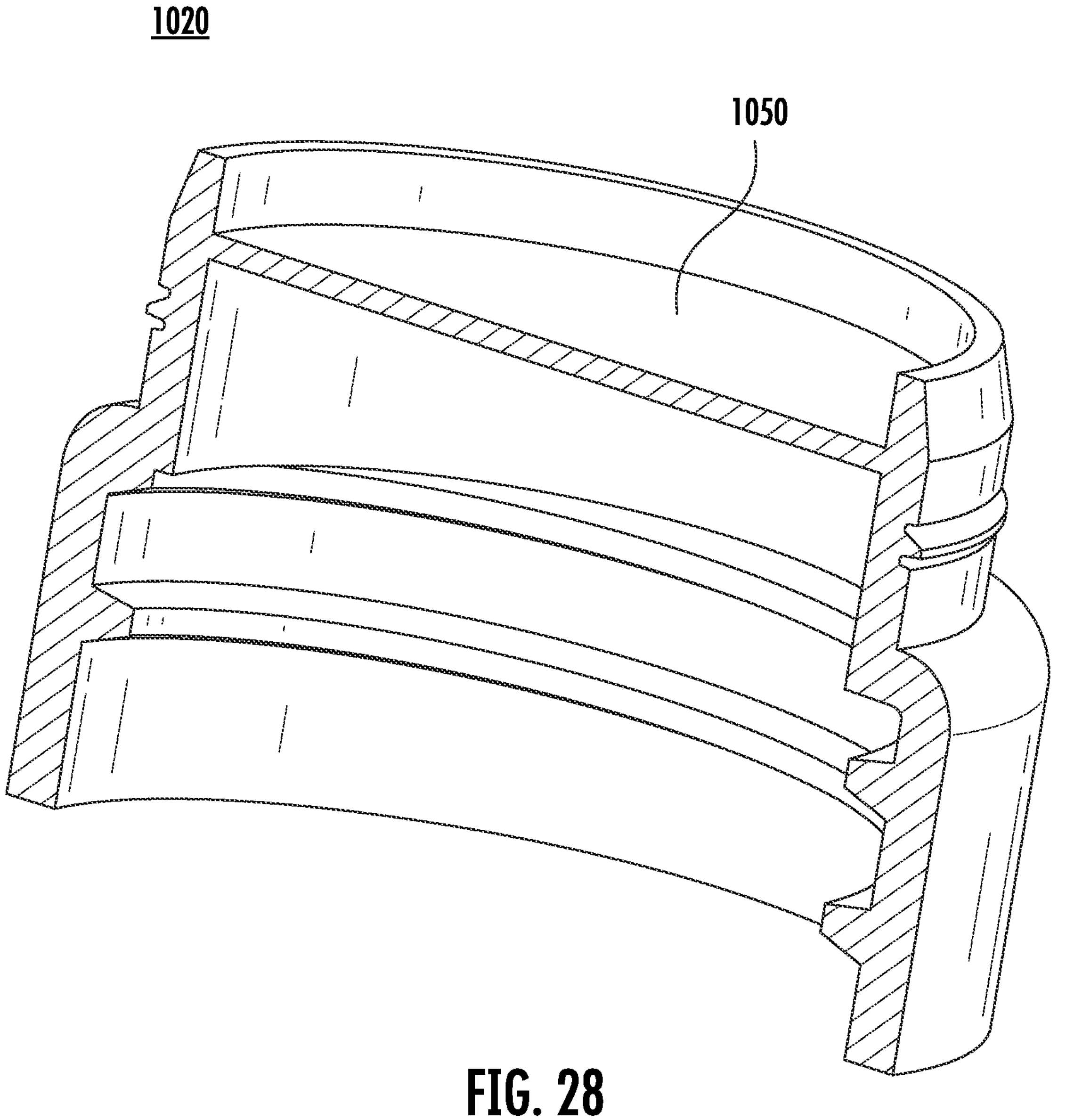
FIG. 28 illustrates a single-sided adapter having the first side as a cap with a puncturable membrane for attachment to the bottle and the opposing side of the single-sided adapter suitable for a friction fit with the spray gun in accordance with an embodiment of the present invention.

FIG. 28 illustrates single-sided adapter 1020 having the first side as a cap with a puncturable membrane 1050 for attachment to the bottle and the opposing side of the single-sided adapter suitable for a friction fit with the spray gun in accordance with an embodiment of the present invention.

Figure 29:
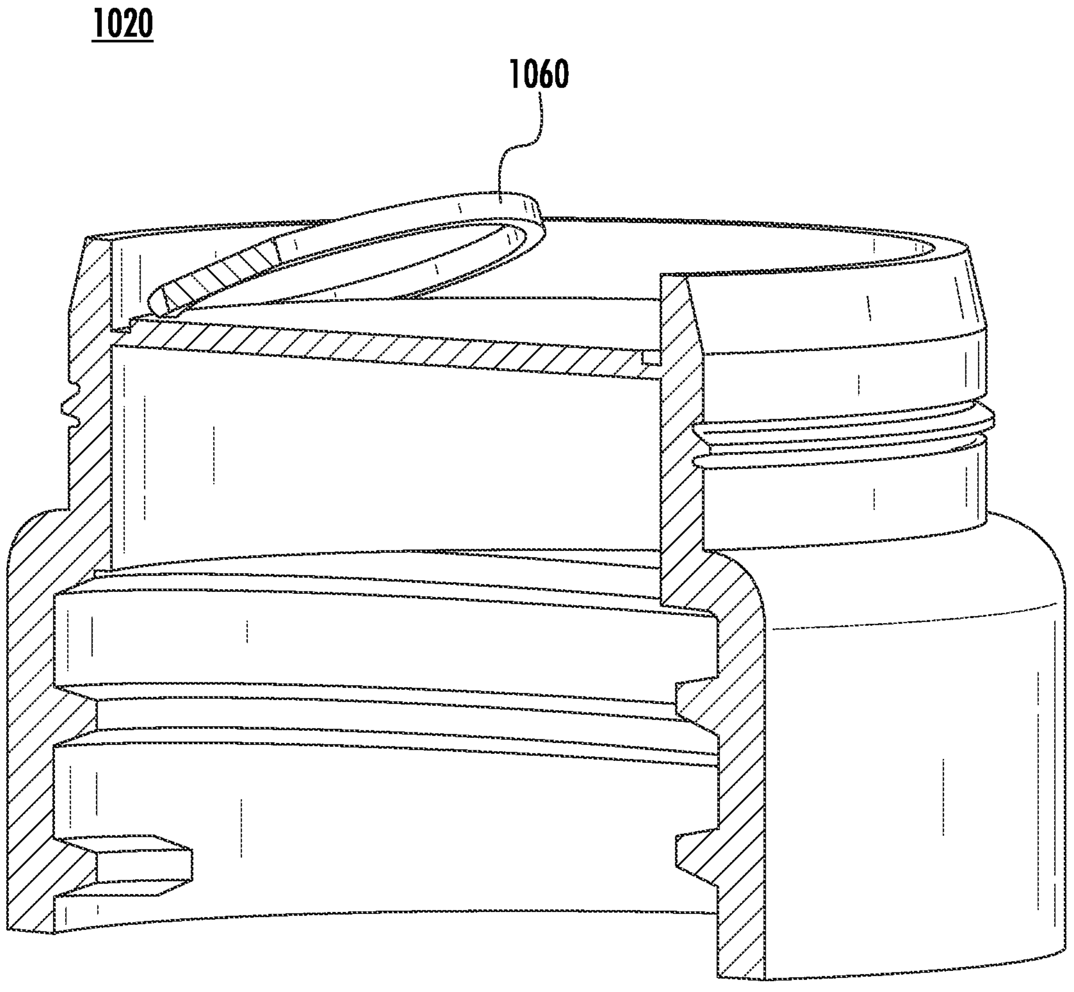
FIG. 29 illustrates a single-sided adapter having the first side as a cap with a tear off membrane for attachment to the bottle and the opposing side of the single-sided adapter suitable for a friction fit with the spray gun in accordance with an embodiment of the present invention.

FIG. 29 illustrates a single-sided adapter 1020 having the first side as a cap with a tear off membrane 1060 for attachment to the bottle and the opposing side of the single-sided adapter suitable for a friction fit with the spray gun in accordance with an embodiment of the present invention.

Figure 30:
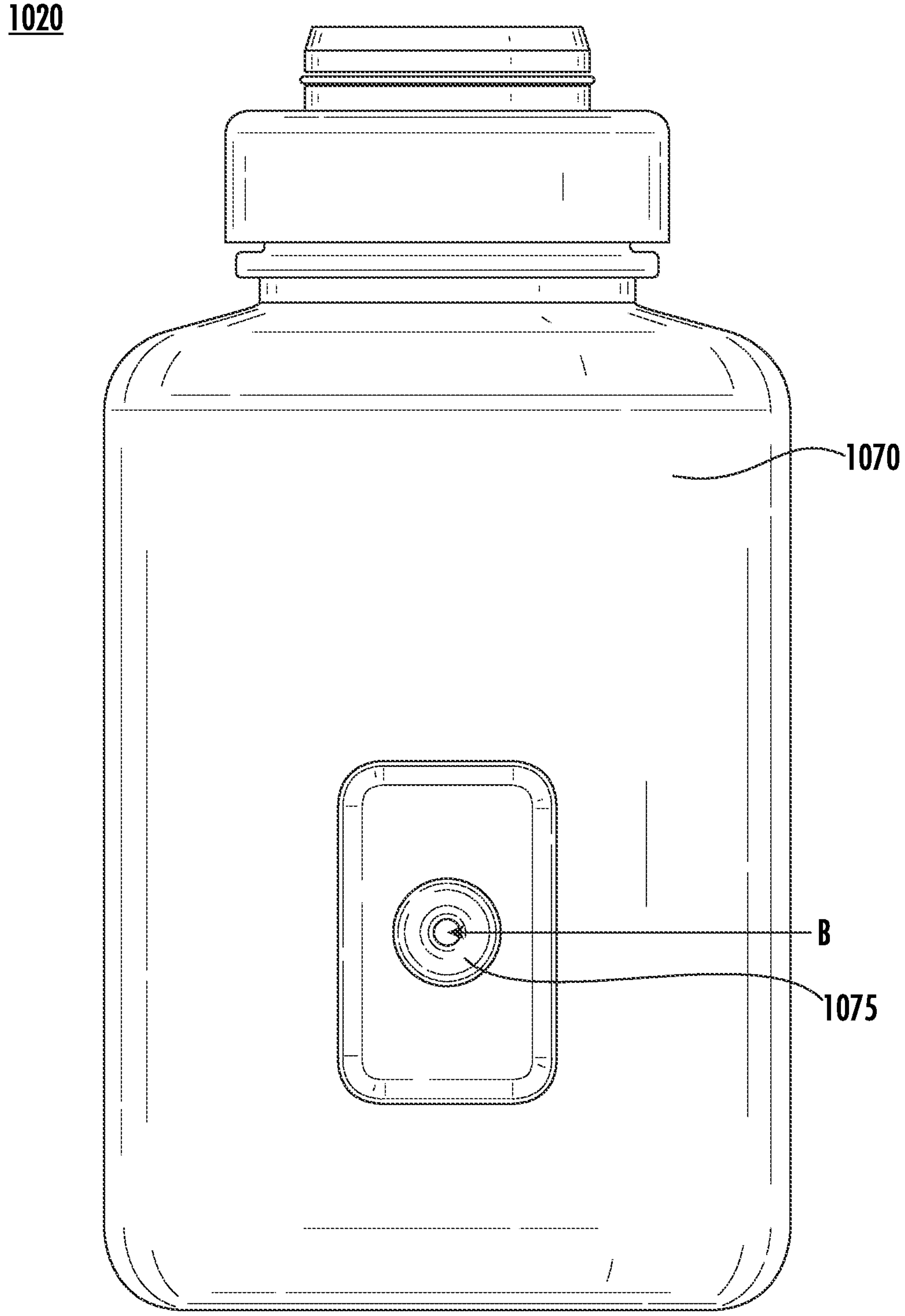
FIG. 30 illustrates a single-sided adapter suitable for a friction fit with the spray gun on a bottle having a pierceable protrusion to serve as a vent on the bottle in accordance with an embodiment of the present invention.

FIG. 30 illustrates a single-sided adapter suitable for a friction fit with the spray gun on a bottle 1070 having a protrusion 1075 that is pierceable at point B and serves as a vent once pierced. Preferably, the pierceable protrusion is located in a bottom half of the bottle.

Figure 31:
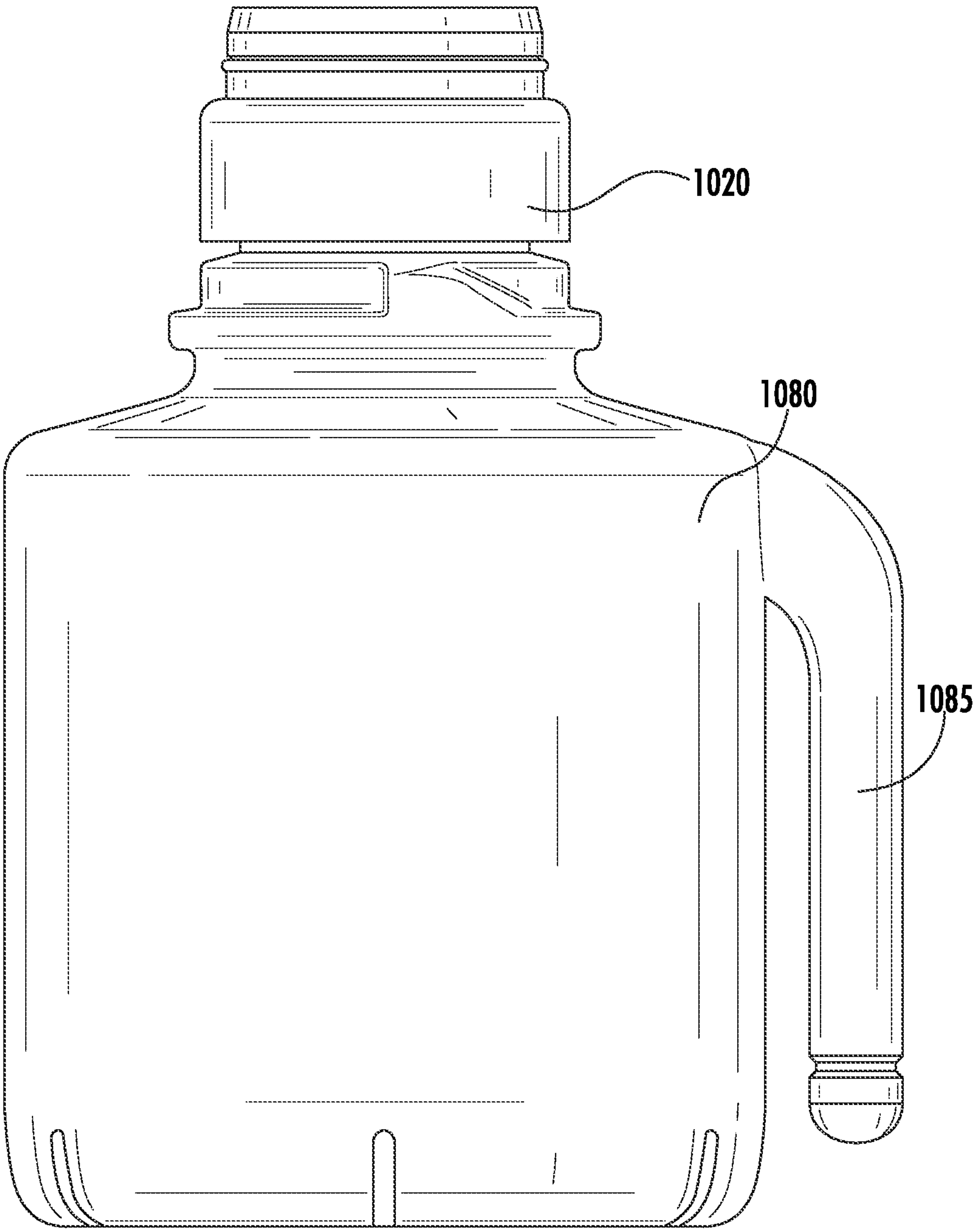
FIG. 31 illustrates a single-sided adapter suitable for a friction fit with the spray gun on a bottle having a single vent tube in accordance with an embodiment of the present invention.

FIG. 31 illustrates a single-sided adapter 1020 suitable for a friction fit with the spray gun on a bottle 1080 having a single vent tube 1085 in accordance with an embodiment of the present invention.

Figure 32:
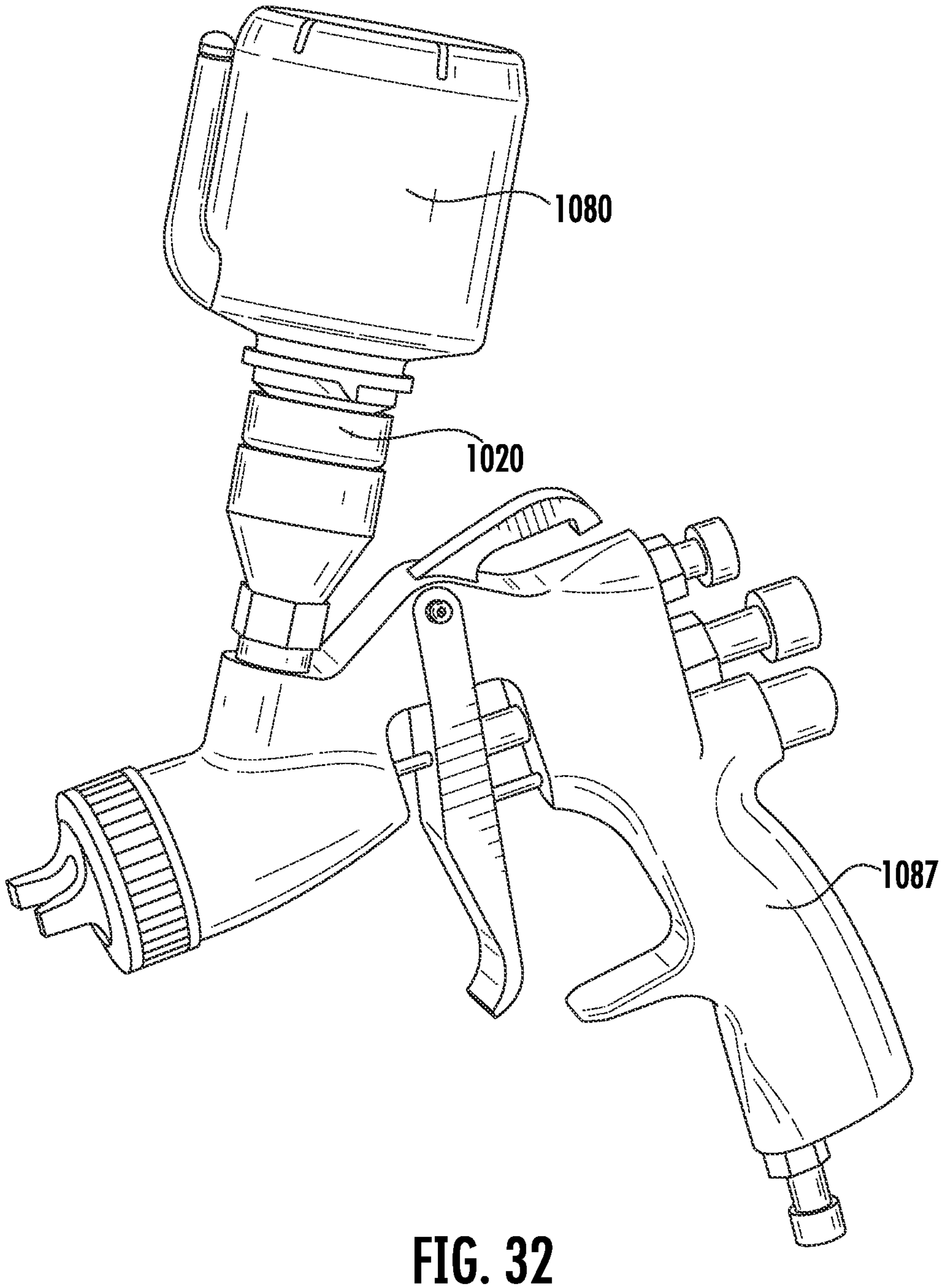
FIG. 32 illustrates a spray gun attached to the single-sided adapter and bottle of FIG. 31 with vent tab intact in accordance with an embodiment of the present invention.

FIG. 32 illustrates a spray gun 1087 attached to the single-sided adapter 1020 and bottle 1080 of FIG. 31.

Figure 33:
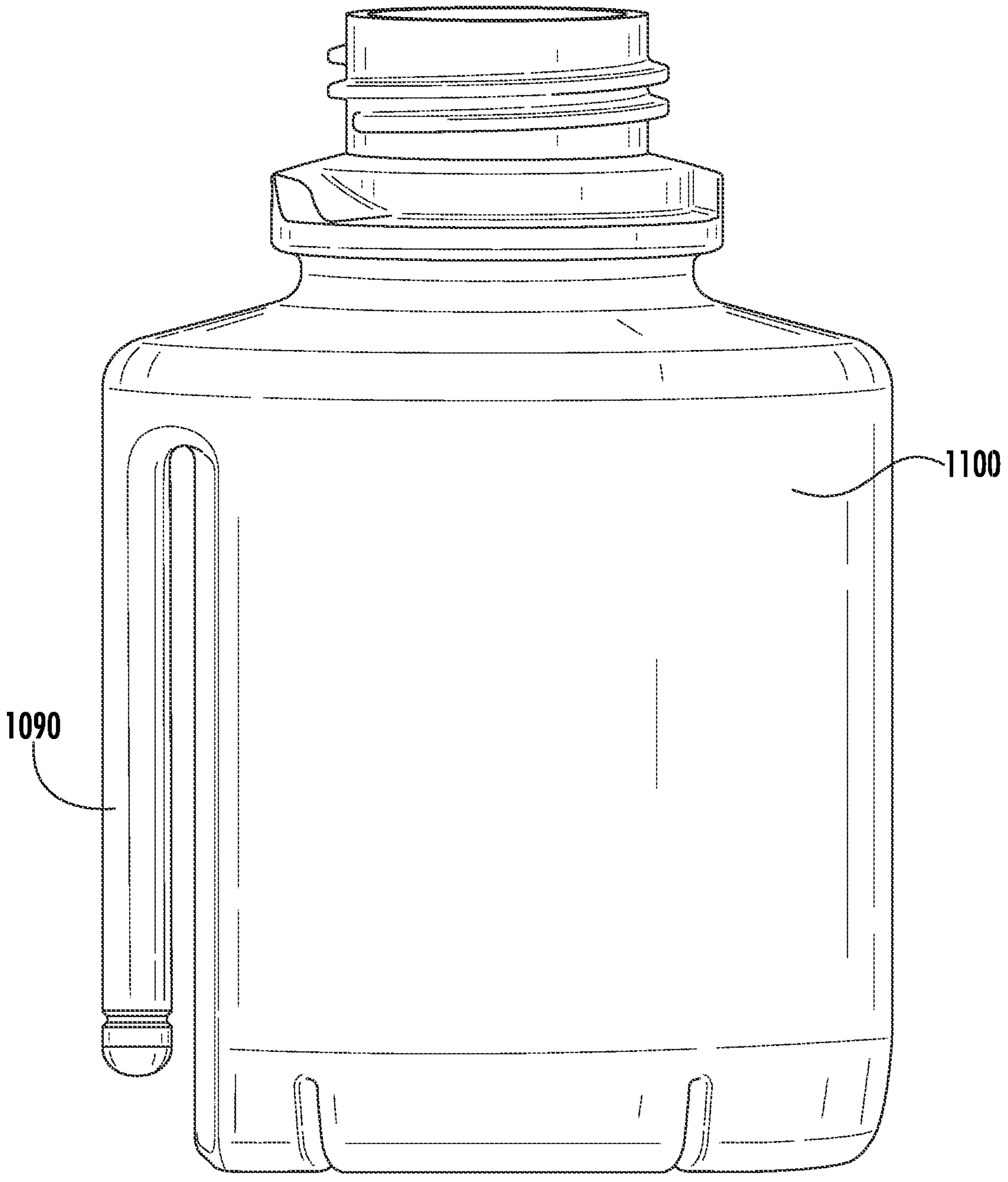
FIG. 33 illustrates a spray gun bottle having a vent(s) within the circumference of the spray gun bottle as opposed be being attached to outer circumference of the spray gun bottle in accordance with the present invention.

FIG. 33 illustrates a spray gun bottle 1100 having a vent(s) 1090 within the inner circumference of the body of the spray gun bottle as opposed be being attached to outer circumference of the body of the spray gun bottle.

Figure 34:
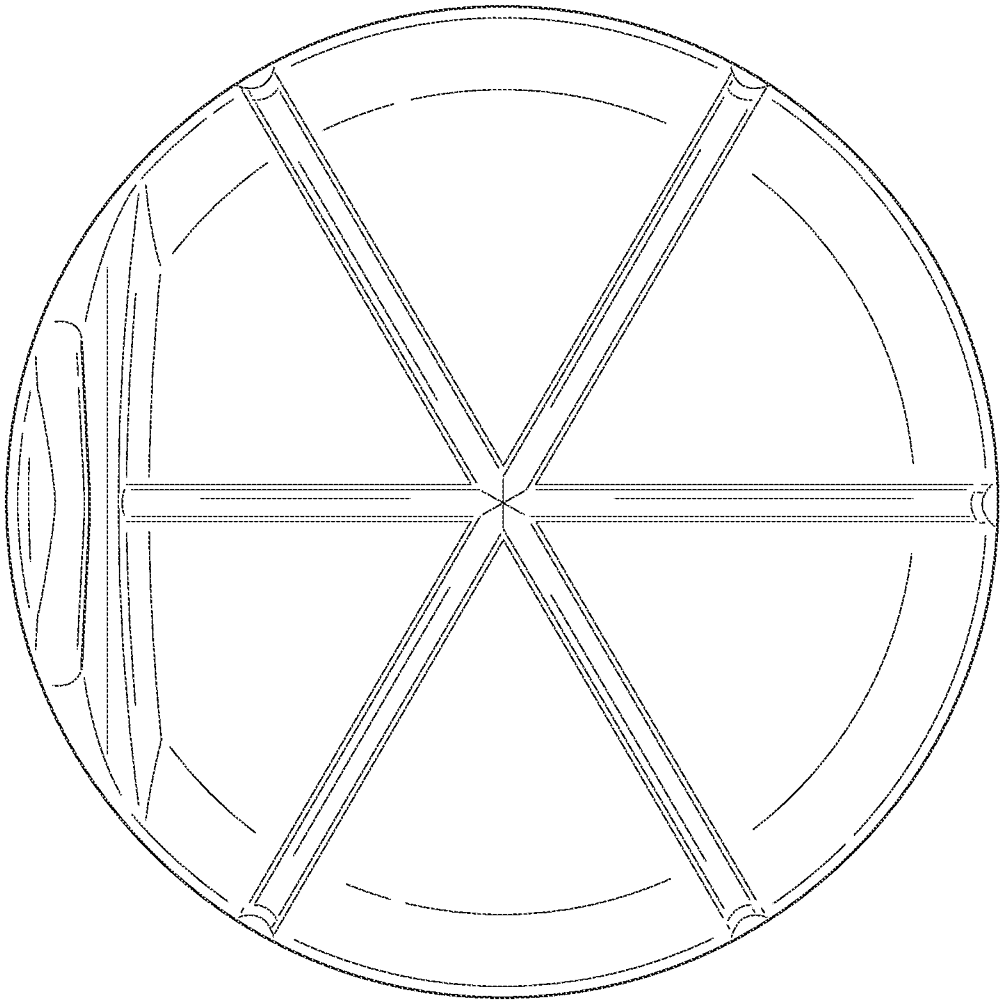
FIG. 34 illustrates a bottom view of spray gun bottle 1100 of FIG. 33.

FIG. 34 illustrates a bottom view of spray gun bottle 1100 of FIG. 33.

Advantages of the device of the present invention include less steps, less mess, save time for autobody shops, rigid, one-time use, package with vent, among others.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A spray gun system comprising:

a bottle having a top end, a body, a bottom end, and a mouth, the mouth is positioned on the top end of the bottle which opens into the body of the bottle for containing a liquid, wherein the mouth has an externally threaded opening and the body of the bottle comprises at least one vent radially extending from the bottle at a location more proximate to the top end of the bottle than the bottom end of the bottle and in a direction towards the bottom end of the bottle, and a monolithic adapter having a central bore, a bottle-attachment first end, and a spray sun attachment second end, wherein the bottle attachment first end comprises an internal thread configured for attachment to the externally threaded opening of the mouth of the bottle, and wherein the spray gun attachment second end comprises an external, non-threaded friction fit interface configured for direct attachment to a spray gun.

2. The spray gun system according to claim 1, wherein the at least one vent comprises at least one tubular vent.

3. The spray gun system according to claim 2, wherein the at least one tubular vent further comprises a removable vent tab.

4. The spray gun system according to claim 2, wherein the at least one tubular vent extends in a direction opposite the mouth of the bottle.

5. The spray gun system of claim 1, wherein the at least one vent extends outwardly from the body of the bottle.

6. A spray gun system comprising:

a bottle having a top end, a body, a bottom end, a mouth, and at least one vent, wherein the mouth is positioned on the top end of the bottle and includes an externally threaded opening that opens into the body of the bottle for containing a liquid, and wherein the at least one vent is formed at a location more proximate to the top end of the bottle than the bottom end of the bottle and extends external to the body of the bottle containing the liquid and in a direction towards the bottom end of the bottle, and a monolithic adapter having a central bore, a bottle-attachment first end, and a spray gun attachment second end, wherein the bottle-attachment first end comprises an internal thread configured for attachment to the externally threaded opening of the mouth of the bottle, and wherein the spray gun attachment second end comprises an external, non-threaded friction fit interface configured for attachment to a spray gun.

* * * * *